United States Patent
Höglund et al.

(10) Patent No.: US 11,812,476 B2
(45) Date of Patent: **\*Nov. 7, 2023**

(54) MULTIPLE TBS FOR MSG3 IN DATA TRANSMISSION DURING RANDOM ACCESS

(71) Applicant: Telefonaktiebolaget LM Ericsson (publ), Stockholm (SE)

(72) Inventors: Andreas Höglund, Solna (SE); Johan Bergman, Stockholm (SE); Olof Liberg, Enskede (SE); Dung Pham Van, Upplands Väsby (SE); Yutao Sui, Solna (SE); Tuomas Tirronen, Helsinki (FI); Emre Yavuz, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,972

(22) Filed: Jun. 7, 2022

(65) Prior Publication Data

US 2022/0304070 A1 Sep. 22, 2022

Related U.S. Application Data

(63) Continuation of application No. 16/963,041, filed as application No. PCT/EP2019/050110 on Jan. 3, 2019, now Pat. No. 11,399,394.
(Continued)

(51) Int. Cl.
*H04W 74/08* (2009.01)
*H04W 72/23* (2023.01)

(52) U.S. Cl.
CPC ....... *H04W 74/0833* (2013.01); *H04W 72/23* (2023.01)

(58) Field of Classification Search
None
See application file for complete search history.

(56) References Cited

U.S. PATENT DOCUMENTS 10,616,886 B2 * 4/2020 Marinier ............... H04W 72/23
10,779,333 B2 * 9/2020 Ye ..................... H04W 74/0833
(Continued)

FOREIGN PATENT DOCUMENTS

CN          105075347 A      11/2015
WO       2015127424 A1       8/2015
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 15)", Technical Specification, 3GPP TS 36.213 V15.0.0, Dec. 1, 2017, pp. 1-493, 3GPP.
(Continued)

*Primary Examiner* — Hong S Cho
(74) *Attorney, Agent, or Firm* — COATS & BENNETT, PLLC

(57) ABSTRACT

A base station transmits a resource grant indicating a plurality of options from which a wireless device is permitted to select for use in transmitting user data on an uplink during random access. Each respective option comprises a transport block size (TBS) and a number of repetitions. One of the TBSs is a maximum permitted TBS and the other TBSs are derived from the maximum permitted TBS using a predefined set of smaller TBS values. The number of repetitions of each option is determined as a function of the maximum permitted TBS and a corresponding number of repetitions. The wireless device receives the resource grant and transmits the user data on the uplink during random access to the base station according to at least one of the options. The base
(Continued)

station receives the user data on the uplink during random access correspondingly.

26 Claims, 24 Drawing Sheets

Related U.S. Application Data

(60) Provisional application No. 62/621,527, filed on Jan. 24, 2018.

(56) References Cited

U.S. PATENT DOCUMENTS

| | | | |
|---|---|---|---|
| 2011/0176500 A1 | 7/2011 | Wager et al. | |
| 2014/0233530 A1 | 8/2014 | Damnjanovic et al. | |
| 2017/0273113 A1 | 9/2017 | Tirronen et al. | |
| 2019/0028905 A1 | 1/2019 | Veeramallu | |
| 2020/0037345 A1 | 1/2020 | Ryoo et al. | |
| 2020/0059390 A1* | 2/2020 | Zhang | H04L 1/1896 |
| 2021/0058823 A1* | 2/2021 | Liu | H04L 5/0053 |
| 2021/0176788 A1* | 6/2021 | Shin | H04W 72/0446 |

FOREIGN PATENT DOCUMENTS

| | | |
|---|---|---|
| WO | 2017082950 A1 | 5/2017 |
| WO | 2018062957 A1 | 4/2018 |
| WO | 2018174577 A1 | 9/2018 |
| WO | 2018185654 A1 | 10/2018 |
| WO | 2018212699 A1 | 11/2018 |
| WO | 2019064261 A1 | 4/2019 |
| WO | 2019201563 A1 | 10/2019 |

OTHER PUBLICATIONS

3rd Generation Partnership Project, "3rd Generation Partnership Project; Technical Specification Group Radio Access Network; Evolved Universal Terrestrial Radio Access (E-UTRA); Medium Access Control (MAC) protoco specification (Release 15)", Technical Specification, 3GPP TS 36.321 V15.0.0, Dec. 1, 2017, pp. 1-109, 3GPP.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 15)", Technical Specification, 3GPP TS 36.331 V15.0.1, Jan. 1, 2018, pp. 1-776, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Technical Specification, 3GPP TS 36.300 15.0.0, Dec. 1, 2017, pp. 1-338, 3GPP.

Ericsson, "Early data transmission for MTC", 3GPP TSG-RAN WG1 Meeting #91, Reno, USA, Nov. 27, 2017, pp. 1-5, R1-1719350, 3GPP.

Mediatek Inc., "On NB-IoT EDT indication via Prach", 3GPP TSG RAN WG2 Meeting #100, Reno, USA, Nov. 27, 2017, pp. 1-6, R2-1713679, 3GPP.

Sierra Wireless S.A., "PRACH for EDT requests", 3GPP TSG-RAN WG2 #100, Reno, USA, Nov. 27, 2017, pp. 1-4, R2-1713862, 3GPP.

The European Telecommunications Standards Institute, "LTE; Evolved Universal Terrestrial Radio Access (E-UTRA); Radio Resource Control (RRC); Protocol specification (3GPP TS 36.331 version 14.4.0 Release 14)", ETSI TS 136 331 V14.4.0, Oct. 1, 2017, pp. 1-761, ETSI.

LG Electronics, "Data transmission during random access procedure in NB-IoT", 3GPP TSG RAN WG1 Meeting #88bis, Spokane, USA, Apr. 3, 2017, pp. 1-6, R1-1704853, 3GPP.

WI Rapporteur (Ericsson), "RAN1 agreements for Rel-15 Further NB-IoT enhancements", 3GPP TSG-RAN NG1 Meeting #91, Reno, USA, Nov. 27, 2017, pp. 1-13, R1-1721314, 3GPP.

Ericsson, "TB sizes and UL grant for Msg3", 3GPP TSG-RAN WG2 #101, Athens, Greece, Feb. 26, 2018, pp. 1-6, R2-1803080, 3GPP.

Ericsson, "[99bis#53][MTC/NB-IoT] EDT indication via PRACH", 3GPP TSG-RAN WG2 #100, Reno, USA, Nov. 27, 2017, pp. 1-29, R2-1713057, 3GPP.

MCC Support, "Final Report of 3GPP TSG RAN WG1 #90bis v1.0.0 (Prague, Czech Rep, Oct. 9-13, 2017)", 3GPP TSG RAN WG1 Meeting #91, Reno, USA, Nov. 27, 2017, pp. 1-206, R1-1719301, 3GPP.

Huawei, et al. "Introduction of EDT for eMTC and NB-IoT enhancements", 3GPP TSG-RAN2 Meeting #101, Athens, Greece, Feb. 26, 2018, pp. 1-54, R2-1803443, 3GPP.

Shan, B. et al., "Reply LS to RAN1 on early data transmission", 3GPP TSG RAN WG2 Meeting #101, Athens, Greece, Feb. 26, 2018, pp. 1-2, R2-1803884, 3GPP.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 15)", Technical Specification, 3GPP TS 36.331 V15.1.0, pp. 1-76, 3GPP, Jun. 2022.

Qualcomm Incorporated, "Physical Layer Aspects of Data Transmission During Random Access Procedure", 3GPP TSG RAN WG1 Meeting #92bis, Sanya, China, Apr. 16, 2018, pp. 1-5, R1-1804921, 3GPP.

ZTE, "Consideration on early data transmission in FeNB-IoT", 3GPP TSG-RAN WG2 Meeting #99, Berlin, Germany, Aug. 21, 2017, pp. 1-11, R2-1707805, 3GPP.

3rd Generation Partnership Project, "3rd Generation Partnership Project; Technical Specification Group Radio Access Network; Evolved Universal Terrestrial Radio Access (E-UTRA); Physical layer procedures (Release 15)", Technical Specification, 3GPP TS 36.213 V15.1.0, Mar. 1, 2018, pp. 1-609, 3GPP.

Huawei, et al., "Introduction of EDT for eMTC and NB-IoT enhancements", 3GPP TSG-RAN2 Meeting #101bis, Sanya, China, Apr. 16, 2018, pp. 1-68, R2-1804331.

* cited by examiner

| EXAMPLE DCI CONTENTS | | |
|---|---|---|
| DCI CONTENTS | CE MODE A | CE MODE B |
| Msg3 PUSCH narrowband index | $N_{NB}^{index}$ | 2 |
| Msg3 PUSCH Resource allocation | 4 | 3 |
| Number of Repetitions for Msg3 PUSCH | 2 | 3 |
| MCS | 3 | 0 |
| TBS | 0 | 2 |
| TPC | 3 | 0 |
| CSI request | 1 | 0 |
| UL delay | 1 | 0 |
| Msg3/4 MPDCCH narrowband index | 2 | 2 |
| Zero padding | $4-N_{NB}^{index}$ | 0 |
| Total Nr-bits | 20 | 12 |

| MSC INDEX FOR Msg3 NPUSCH | | | | |
|---|---|---|---|---|
| MSC INDEX $I_{MSC}$ | MODULATION $\Delta f = 3.75\ kHz$ or $\Delta f = 15\ kHz$ and $I_{SC} = 0, 1, ..., 11$ | MODULATION $\Delta f = 15\ kHz$ and $I_{SC} > 11$ | NUMBER OF RUs $N_{RU}$ | TBS |
| '000' | pi/2 BPSK | QPSK | 4 | 88 BITS |
| '001' | pi/4 QPSK | QPSK | 3 | 88 BITS |
| '010' | pi/4 QPSK | QPSK | 1 | 88 BITS |
| '011' | RESERVED | RESERVED | RESERVED | RESERVED |
| '100' | RESERVED | RESERVED | RESERVED | RESERVED |
| '101' | RESERVED | RESERVED | RESERVED | RESERVED |
| '110' | RESERVED | RESERVED | RESERVED | RESERVED |
| '111' | RESERVED | RESERVED | RESERVED | RESERVED |

FIG. 11

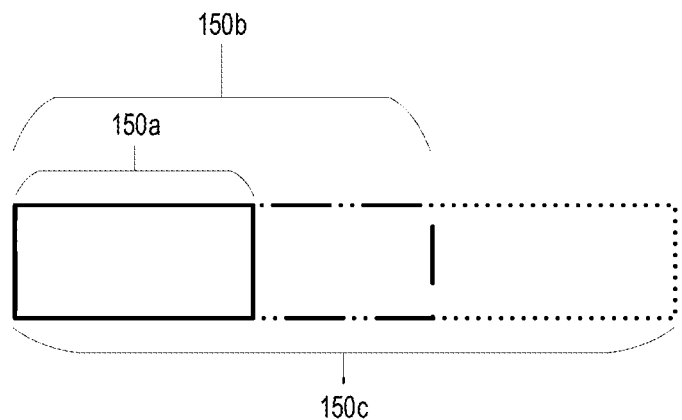

FIG. 12A

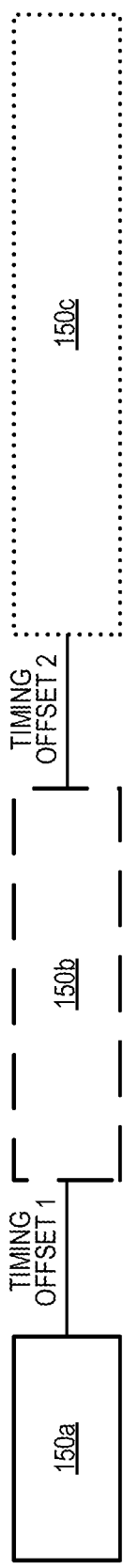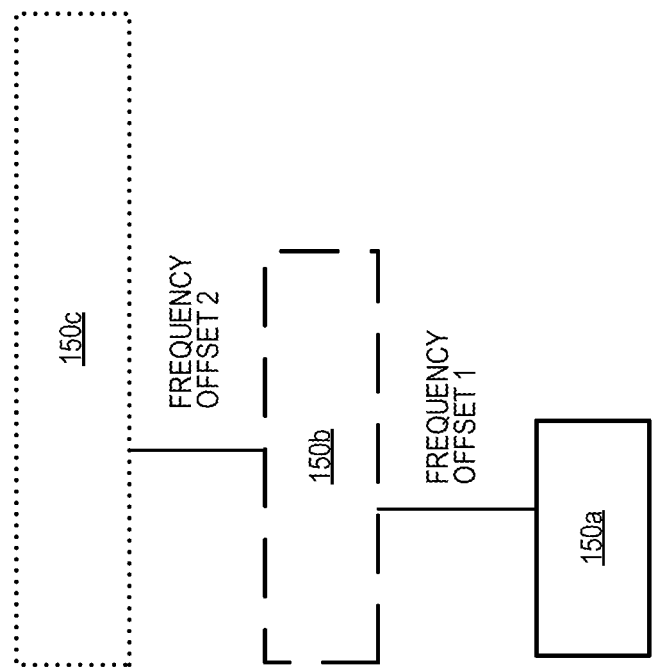

| MSC INDEX FOR EDT Msg3 NPUSCH ||||||||
| MSC INDEX $I_{MSC}$ | MODULATION $\Delta f = 15\ kHz$ and $I_{SC} > 11$ | NUMBER OF RUs 1 $N_{RU}$ | NUMBER OF RUs 2 $N_{RU}$ | NUMBER OF RUs 3 $N_{RU}$ | TBS 1 | TBS 2 | TBS 3 |
|---|---|---|---|---|---|---|---|
| '00000' | QPSK | --- | 10 | 5 | --- | 568 BITS | 256 BITS |
| '00001' | QPSK | 10 | 5 | 3 | 872 BITS | 424 BITS | 224 BITS |
| '00010' | QPSK | 8 | 5 | 3 | 1000 BITS | 584 BITS | 328 BITS |
| '00011' | QPSK | 8 | 5 | --- | 1000 BITS | 584 BITS | --- |
| '00100' | QPSK | 8 | --- | --- | 1000 BITS | --- | --- |
| ⋮ | | | | | | | |
| ⋮ | | | | | | | |
| '11101' | QPSK | 4 | 3 | 1 | 1000 BITS | 680 BITS | 208 BITS |
| '11110' | QPSK | RESERVED | RESERVED | RESERVED | RESERVED | RESERVED | RESERVED |
| '11111' | QPSK | RESERVED | RESERVED | RESERVED | RESERVED | RESERVED | RESERVED |

FIG. 13

| Time offset index: | $\Delta t$: |
|---|---|
| '00' | $t_1$ |
| '01' | $t_2$ |
| '10' | $t_3$ |
| '11' | $t_4$ |

FIG. 14

| TBS VALUES SUPPORTED IN A CELL FOR USER DATA TRANSMISSION IN Msg3 | | | |
|---|---|---|---|
| INDEX | MODULATION | NUMBER OF RUs $N_{RU}$ | TBS (BITS) |
| TBS1-0 | QPSK | 6 | 1000 |
| TBS1-1 | QPSK | 8 | 1000 |
| TBS1-2 | QPSK | 10 | 1000 |
| TBS2-0 | QPSK | 3 | 680 |
| TBS2-1 | QPSK | 4 | 680 |
| TBS2-2 | QPSK | 8 | 680 |
| TBS3-0 | QPSK | 2 | 328 |
| TBS3-1 | QPSK | 3 | 328 |

FIG. 15

| MSC INDEX FOR EDT Msg3 NPUSCH SIGNALLED IN RAR | | | |
|---|---|---|---|
| MSC INDEX $I_{MSC}$ | TBS 1 | TBS 2 | TBS 3 |
| '000' | TBS1-0 | - | - |
| '001' | TBS1-1 | TBS2-1 | - |
| '010' | TBS1-0 | TBS2-0 | TBS3-0 |
| '011' | TBS1-1 | TBS2-1 | TBS1-0 |
| ⋮ | | | |
| ⋮ | | | |
| '111' | TBS1-2 | TBS2-2 | TBS3-1 |

FIG. 16

| $I_{TBS}$ | Transport block size (TBS) table for NPUSCH $I_{RU}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | 1224 |
| 8 | 120 | 256 | 392 | 536 | 680 | 808 | 1096 | 1384 |
| 9 | 136 | 296 | 456 | 616 | 776 | 936 | 1256 | 1544 |
| 10 | 144 | 328 | 504 | 680 | 872 | 1000 | 1384 | 1736 |
| 11 | 176 | 376 | 584 | 776 | 1000 | 1192 | 1608 | 2024 |
| 12 | 208 | 440 | 680 | 1000 | 1128 | 1352 | 1800 | 2280 |
| 13 | 224 | 488 | 744 | 1032 | 1256 | 1544 | 2024 | 2536 |

FIG. 17

| RANDOM ACCESS RESPONSE GRANT CONTENT FIELD SIZE | | |
| --- | --- | --- |
| DCI CONTENTS | CE MODE A | CE MODE B |
| Msg3 PUSCH narrowband index | $N_{NB}^{index}$ | 2 |
| Msg3 PUSCH Resource allocation | 4 | 3 |
| Number of Repetitions for Msg3 PUSCH | 2 | 3 |
| MCS | 3 | 0 |
| TBS | 0 | 2 |
| TPC | 3 | 0 |
| CSI request | 1 | 0 |
| UL delay | 1 | 0 |
| Msg3/4 MPDCCH narrowband index | 2 | 2 |
| Zero padding | $4-N_{NB}^{index}$ | 0 |
| Total Nr-bits | 20 | 12 |

FIG. 18

| Index for EDT Msg3 PUSCH, TBS and explicit number of repetitions are bundled | | | | | | |
| --- | --- | --- | --- | --- | --- | --- |
| Index | Number of repetitions for TBS1 | Number of repetitions for TBS2 | Number of repetitions for TBS3 | TBS 1 | TBS 2 | TBS 3 |
| '00000' | - | 2 | 1 | - | 568 bits | 256 bits |
| '00001' | 8 | 4 | 2 | 872 bits | 424 bits | 224 bits |
| '00010' | 8 | 4 | 2 | 1000 bits | 584 bits | 328 bits |
| '00011' | 16 | 8 | - | 1000 bits | 584 bits | - |
| '00100' | 16 | - | - | 1000 bits | - | - |
| ⋮ | | | | | | |
| ⋮ | | | | | | |
| '11101' | 256 | 128 | 32 | 1000 bits | 680 bits | 208 bits |
| '11110' | reserved | reserved | reserved | reserved | reserved | reserved |
| '11111' | reserved | reserved | reserved | reserved | reserved | reserved |

FIG. 19

| Index for EDT Msg3 PUSCH, TBS and inexplicit number of repetitions are bundled ||||||
|---|---|---|---|---|---|---|
| Index | Number of repetitions for TBS1 | Number of repetitions for TBS2 | Number of repetitions for TBS3 | TBS 1 | TBS 2 | TBS 3 |
| '00000' | - | Y/16 | Y/32 | - | 568 bits | 256 bits |
| '00001' | Y/8 | Y/16 | Y/32 | 872 bits | 424 bits | 224 bits |
| '00010' | Y/8 | Y/16 | Y/32 | 1000 bits | 584 bits | 328 bits |
| '00011' | Y/4 | Y/8 | - | 1000 bits | 584 bits | - |
| '00100' | Y/4 | - | - | 1000 bits | - | - |
| ⋮ | | | | | | |
| '11101' | Y | Y/2 | Y/4 | 1000 bits | 680 bits | 208 bits |
| '11110' | reserved | reserved | reserved | reserved | reserved | reserved |
| '11111' | reserved | reserved | reserved | reserved | reserved | reserved |

FIG. 20

| Index for EDT Msg3 PUSCH, TBS and explicit number of repetitions are bundled ||||||
|---|---|---|---|---|---|---|
| Index | Number of PRBs for TBS 1 | Number of PRBs for TBS 2 | Number of PRBs for TBS 3 | TBS 1 | TBS 2 | TBS 3 |
| '00000' | - | 2 | 1 | - | 568 bits | 256 bits |
| '00001' | 4 | 2 | 1 | 872 bits | 424 bits | 224 bits |
| '00010' | 6 | 3 | 2 | 1000 bits | 584 bits | 328 bits |
| '00011' | 6 | 3 | - | 1000 bits | 584 bits | - |
| '00100' | 6 | - | - | 1000 bits | - | - |
| ⋮ | | | | | | |
| '11101' | 6 | 5 | 2 | 1000 bits | 680 bits | 208 bits |
| '11110' | reserved | reserved | reserved | reserved | reserved | reserved |
| '11111' | reserved | reserved | reserved | reserved | reserved | reserved |

FIG. 21

| TBS values supported in a cell for user data transmission in Msg3 | | |
|---|---|---|
| Index | Modulation | TBS (bits) |
| TBS1-0 | QPSK | 1000 |
| TBS1-1 | QPSK | 1000 |
| TBS1-2 | QPSK | 1000 |
| TBS2-0 | QPSK | 680 |
| TBS2-1 | QPSK | 680 |
| TBS2-2 | QPSK | 680 |
| TBS3-0 | QPSK | 328 |
| TBS3-1 | QPSK | 328 |

FIG. 22

| Example of TBS and Number of Repetitions for Msg3 PUSCH | | | | | | | | |
|---|---|---|---|---|---|---|---|---|
| | Number of Repetitions for Msg3 PUSCH | | | | | | | |
| Row index | 1 or Y_max/128 | 2 or Y_max/64 | 4 or Y_max/32 | 8 or Y_max/16 | 16 or Y_max/8 | 32 or Y_max/4 | 64 or Y_max/2 | 128 or Y_max |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | 1224 |
| 8 | 120 | 256 | 392 | 536 | 680 | 808 | 1096 | 1384 |
| 9 | 136 | 296 | 456 | 616 | 776 | 936 | 1256 | 1544 |
| 10 | 144 | 328 | 504 | 680 | 872 | 1000 | 1384 | 1736 |
| 11 | 176 | 376 | 584 | 776 | 1000 | 1192 | 1608 | 2024 |
| 12 | 208 | 440 | 680 | 1000 | 1128 | 1352 | 1800 | 2280 |
| 13 | 224 | 488 | 744 | 1032 | 1256 | 1544 | 2024 | 2536 |

FIG. 23

| MAX TBS | CE MODE A | | | | | | | | CE MODE B | | | | | | | |
|---|---|---|---|---|---|---|---|---|---|---|---|---|---|---|---|---|
| | 328 | 408 | 504 | 600 | 712 | 808 | 936 | 1000 | 328 | 408 | 456 | 504 | 600 | 712 | 808 | 936 |
| TBS 1 | 328 | 328 | 328 | 328 | 328 | 328 | 328 | 328 | 328 | 328 | 328 | 328 | 328 | 328 | 328 | 328 |
| TBS 2 | | 408 | 408 | 408 | 456 | 504 | 504 | 536 | | 408 | 408 | 408 | 408 | 456 | 504 | 504 |
| TBS 3 | | | 456 | 504 | 600 | 712 | 712 | 776 | | | 456 | 456 | 504 | 600 | 712 | 712 |
| TBS 4 | | | 504 | 600 | 712 | 808 | 936 | 1000 | | | | 504 | 600 | 712 | 808 | 936 |

FIG. 33

MULTIPLE TBS FOR MSG3 IN DATA TRANSMISSION DURING RANDOM ACCESS

RELATED APPLICATIONS

This application is a continuation of U.S. patent application Ser. No. 16/963,041, which was filed on 17 Jul. 2020, which is the national stage application of International Patent Application PCT/EP2019/050110, which was filed 3 Jan. 2019, and claims priority to U.S. Provisional Patent Application 62/621,527, filed 24 Jan. 2018, the disclosure of each of which is hereby incorporated by reference in its entirety.

TECHNICAL FIELD

The present disclosure generally relates to the field of wireless communication networks, and more particularly relates to signalling in support of random access to a base station by a wireless device.

BACKGROUND

The Third Generation Partnership Project (3GPP) has worked on specifying technologies pertaining to wireless networks, e.g., to cover Machine-to-Machine (M2M) and/or Internet of Things (IoT) related use cases. Recent work for 3GPP Release 13 and 14 includes enhancements to support Machine-Type Communications (MTC) with new User Equipment (UE) categories (Category M1 (Cat-M1), Category M2 (Cat-M2)), supporting reduced bandwidth of up to 6 and 24 physical resource blocks (PRBs), and Narrowband IoT (NB-IoT) UEs providing a new radio interface (and UE categories Cat-NB1 and Cat-NB2).

Despite the evolution of 3GPP standards to accommodate new use cases, many wireless devices will continue to use some form of random access in order to obtain access to the wireless network. Accordingly, solutions that improve random access procedures, the entities participating therein, and/or the systems relying thereon are likely to continue to be highly desired.

SUMMARY

Embodiments of the present disclosure are directed to a base station that enables a wireless device (e.g., user equipment) to transmit user data on an uplink during random access. The base station transmits a resource grant indicating a plurality of options from which the wireless device is permitted to select for use in transmitting the user data on the uplink during random access. Each respective option comprises a transport block size; and a number of resource units and/or physical resource blocks. The wireless device receives the resource grant, and transmits the user data on the uplink during random access to the base station according to at least one of the options.

More specifically, embodiments of the present disclosure include a method performed by a wireless device for transmitting user data on an uplink during random access. The method comprises receiving a resource grant indicating a plurality of options for the transmitting of the user data on the uplink during random access. Each respective option comprises a transport block size, and a number of resource units, repetitions, and/or physical resource blocks corresponding to the transport block size. The method further comprises transmitting the user data on the uplink during random access to a base station according to at least one of the options.

In some embodiments, receiving the resource grant indicating the plurality of options comprises receiving a modulation and coding scheme index indicating the plurality of options. In some such embodiments the modulation and coding scheme index comprises at least five bits. In some additional or alternative embodiments, receiving the modulation and coding scheme index comprises deriving at least part of the modulation and coding scheme index from an uplink carrier spacing field. Additionally or alternatively, receiving the modulation and coding scheme index comprises deriving at least part of the modulation and coding scheme index from a subcarrier spacing field.

In some embodiments, the method further comprises receiving a time offset index indicating an amount of time between transmission start times respectively corresponding to the random access transmission options.

In some embodiments, the method further comprises receiving a frequency offset index indicating an amount of frequency between transmission frequencies respectively corresponding to the options.

In some embodiments, transmitting the user data on the uplink during the random access is in response to selecting at least one of the options from the plurality of options.

In some embodiments, receiving the resource grant indicating the plurality of options comprises receiving the resource grant in a Msg2 of the random access.

In some embodiments, transmitting the user data on the uplink during the random access to the base station according to the at least one of the options comprises transmitting the user data in a Msg3 of the random access.

In some embodiments, the plurality of options are a subset of a plurality of predefined options for the transmitting of the user data on the uplink during random access, and the method further comprises receiving an indication of how many options are in the subset. In some such embodiments, receiving the indication of how many options are in the subset comprises receiving the indication via cell-specific signalling. In some additional or alternative embodiments, receiving the indication of how many options are in the subset comprises receiving the indication in a System Information broadcast.

In some embodiments, the method further comprises receiving at least one of the options in a System Information broadcast. In some such embodiments, an option in the at least one of the options in the System Information broadcast comprises a maximum permitted transport block size. In some such embodiments, the resource grant grants the wireless device permission to perform the transmitting using the maximum permitted transport block size. In some additional or alternative embodiments, the maximum permitted transport block size is one of a plurality of predefined candidate values available for the maximum permitted transport block size. In some additional or alternative embodiments, the maximum permitted transport block size is one of a plurality of maximum permitted transport block sizes received in the System Information broadcast, each corresponding to a respective coverage enhancement level. In some such embodiments, the plurality of options for the transmitting of the user data on the uplink during random access comprises a respective set of one or more of the options for each of the coverage enhancement levels.

In some embodiments, the method further comprises using a predefined formula to calculate a first option of the plurality of options from a second option of the plurality of options.

Other embodiments include a method performed by a base station for enabling a user equipment to transmit user data on an uplink during random access. The method comprises transmitting a resource grant indicating a plurality of options from which the user equipment is permitted to select for use in transmitting the user data on the uplink during random access. Each respective option comprises a transport block size, and a number of resource units and/or physical resource blocks.

In some embodiments, transmitting the resource grant indicating the plurality of options comprises transmitting a modulation and coding scheme index indicating the plurality of options. In some such embodiments, the modulation and coding scheme index comprises at least five bits. Additionally or alternatively, in some embodiments, transmitting the modulation and coding scheme index comprises at least partly indicating the modulation and coding scheme index in an uplink carrier spacing field. Additionally or alternatively, in some embodiments, transmitting the modulation and coding scheme index comprises at least partly indicating the modulation and coding scheme index in a subcarrier spacing field. Additionally or alternatively, in some embodiments, the method further comprises determining the modulation and coding index based on channel conditions. Additionally or alternatively, in some embodiments, the method further comprises determining the modulation and coding index based on a number of Msg3 grants supported by the base station. Additionally or alternatively, in some embodiments, the method further comprises determining the modulation and coding index based on a size predefined for transmitting during random access.

In some embodiments, the method further comprises transmitting a time offset index indicating an amount of time between transmission start times respectively corresponding to the options.

In some embodiments, the method further comprises transmitting a frequency offset index indicating an amount of frequency between transmission frequencies respectively corresponding to the options.

In some embodiments, the method further comprises transmitting the resource grant indicating the plurality of random access transmission options comprises transmitting the resource grant in a Msg2 of the random access.

In some embodiments, the method further comprises receiving the user data on the uplink during the random access according to at least one of the options. In some such embodiments, receiving the user data on the uplink during the random access comprises receiving the user data in a Msg3 of the random access.

In some embodiments, the plurality of options are a subset of a plurality of predefined options for the transmitting of the user data on the uplink during random access, and the method further comprises transmitting an indication of how many options are in the subset. In some such embodiments, the method further comprises transmitting the indication of how many options are in the subset via cell-specific signalling.

In some embodiments, the method further comprises transmitting at least one of the options in a System Information broadcast. In some such embodiments, an option in the at least one of the options in the System Information broadcast comprises a maximum permitted transport block size. In some such embodiments, the resource grant grants the wireless device permission to use the maximum permitted transport block size in the transmitting of the user data on the uplink during random access. Additionally or alternatively, in some embodiments, the maximum permitted transport block size is one of a plurality of predefined candidate values available for the maximum permitted transport block size. Additionally or alternatively, in some embodiments, the maximum permitted transport block size is one of a plurality of maximum permitted transport block sizes transmitted in the System Information broadcast, each corresponding to a respective coverage enhancement level. In some such embodiments, the plurality of options from which the user equipment is permitted to select for use in the transmitting of the user data on the uplink during random access comprises a respective set of one or more of the options for each of the coverage enhancement levels.

Other embodiments include a wireless device for transmitting user data on an uplink. The wireless device is configured to receive a resource grant indicating a plurality of options for the transmitting of the user data on the uplink during random access. Each respective option comprises a transport block size, and a number of resource units, repetitions, and/or physical resource blocks corresponding to the transport block size. The wireless device is further configured to transmit the user data on the uplink during random access to a base station according to at least one of the options.

In some embodiments, the wireless device comprises a processor and a memory. The memory contains instructions executable by the processor whereby the wireless device is operative to perform the receiving and transmitting.

Additionally or alternatively, in some embodiments, the wireless device comprises a receiving module configured to perform the receiving, and a transmitting module configured to perform the transmitting.

In some embodiments, the wireless device is configured to perform any of the wireless device methods described above.

Other embodiments include a base station for enabling a user equipment to transmit user data on an uplink during random access. The base station is configured to transmit a resource grant indicating a plurality of options from which the user equipment is permitted to select for use in transmitting the user data on the uplink during random access. Each respective option comprises a transport block size, and a number of resource units and/or physical resource blocks.

In some embodiments, the base station comprises a processor and a memory. The memory contains instructions executable by the processor whereby the base station is operative to perform the transmitting.

Additionally or alternatively, in some embodiments, the base station comprises a transmitting module configured to perform the transmitting.

In some embodiments, the base station is configured to perform any of the base station methods described above.

Other embodiments include a computer program comprising instructions which, when executed on at least one processor of a radio node (e.g., a wireless device or base station), cause the at least one processor to carry out any of the methods described above.

Other embodiments include a carrier containing the computer program of the preceding claim, wherein the carrier is one of an electronic signal, optical signal, radio signal, or computer readable storage medium.

Any of the embodiments described above may further comprise one or more of the features described below.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a resource 150, generally, as opposed to discussion of particular instances of resources 150a, 150b, 150c).

FIG. 11 is a table illustrating example Modulation and Coding Scheme (MCS) indices for Message 3 (Msg3) on a Narrowband Physical Uplink Shared Channel (NPUSCH), according to one or more embodiments of the present disclosure.

FIGS. 12A-E are schematic block diagrams illustrating respective examples of uplink (UL) resource allocation, according to one or more embodiments of the present disclosure.

FIG. 13 is a table illustrating an example of MCS indices for Early Data Transmission (EDT) in Msg3 on an NPUSCH, according to one or more embodiments of the present disclosure.

FIG. 14 is a table illustrating an example time offsets, according to one or more embodiments of the present disclosure.

FIG. 15 is a table illustrating example Transport Block Size (TBS) values supported in a cell for user data transmission in Msg3, according to one or more embodiments of the present disclosure.

FIG. 16 is a table illustrating example MCS indices and corresponding values for EDT in Msg3 on an NPUSCH signalled in a Random Access Response (RAR) message, according to one or more embodiments of the present disclosure.

FIG. 17 is a table illustrating example TBSes for an NPUSCH, according to one or more embodiments of the present disclosure.

FIG. 18 is a table illustrating example RAR grant content field size, according to one or more embodiments of the present disclosure.

FIG. 19 is a table illustrating an example of values supporting EDT in Msg3 on a Physical Uplink Shared Channel (PUSCH) in which TBS and an explicit number of repetitions are bundled, according to one or more embodiments of the present disclosure.

FIG. 20 is a table illustrating an example of values supporting EDT in Msg3 on a PUSCH in which TBS and an inexplicit number of repetitions are bundled, according to one or more embodiments of the present disclosure.

FIG. 21 is a table illustrating an example of values supporting EDT in Msg3 on a PUSCH in which TBS and an explicit number of repetitions are bundled, according to one or more embodiments of the present disclosure.

FIG. 22 is a table illustrating an example of TBS values supported in a cell for user data transmission in Msg3, according to one or more embodiments of the present disclosure.

FIG. 23 is a table illustrating an example of TBSes according to a corresponding number of repetitions, according to one or more embodiments of the present disclosure.

FIG. 33 is a table illustrating example TBS sizes, according to one or more embodiments of the present disclosure.

DETAILED DESCRIPTION

Figure 1:
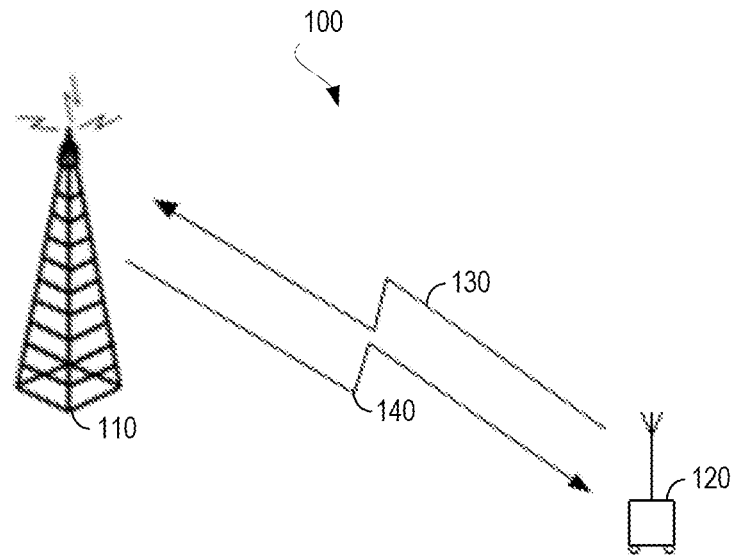
FIG. 1 is a schematic diagram illustrating an example communication system, according to one or more embodiments of the present disclosure.

FIG. 1 illustrates an example communication system according to one or more embodiments of the present disclosure. The communication system comprises a wireless device 120 (e.g., a UE) and a base station 110 that wirelessly communicate with each other using an uplink (UL) 130 and a downlink (DL) 140. According to embodiments the base station 110 may be an access node (e.g., an evolved NodeB (eNB)) that provides the UE with access to a network and/or the wireless device 120 may be a mobile terminal, an NB-IoT UE, and/or other radio node. For purposes of this disclosure, a wireless device 120 is a radio device that performs a random access procedure to communicate with a base station 110, and a base station 110 is a radio node that supports random access by a wireless device 120. Procedures for random access will be discussed further below.

Note that although particular embodiments may specifically refer to a UE, the same or substantially similar principles may be applied to a wireless device 120 that performs random access to a base station 110, even if the wireless device 120 is not necessarily or commonly referred to as a UE per se. Similarly, although particular embodiments may specifically refer to an eNB or network node, the same or substantially similar principles may be applied to a base station 110 that supports random access by a wireless device 120, even if the base station 110 is not necessarily or commonly referred to as an eNB or network node per se.

The base station 110 provides uplink and downlink grants to the wireless device 120. An uplink grant provides the wireless device 120 with scheduling information to use when transmitting on the uplink 130, and the wireless device 120 transmits on the uplink 130 in accordance with the uplink grant. A downlink grant provides the wireless device 120 with scheduling information that describes when a data transmission from the base station 110 may be expected. An uplink or downlink grant may also be referred to as an uplink or downlink assignment, respectively.

The wireless device 120 may need to contact the network (e.g., via the base station 110) without having a dedicated resource in the uplink 130. To handle this, a random access (RA) procedure is available so that such a wireless device 120 may transmit a signal to the base station 110, despite not having a dedicated resource in the uplink 130. The first message of this procedure is typically transmitted by the wireless device 120 on a special resource reserved for random access known as a Physical Random Access Channel (PRACH). The resources available for PRACH transmission may be provided to wireless devices 120 as part of broadcasted system information (or as part of dedicated Radio Resource Control (RRC) protocol signaling in case of, e.g., handover).

The present disclosure will refer to the Long Term Evolution (LTE) enhancements introduced in 3GPP Release 13, 14, and 15 for MTC as Enhanced MTC (eMTC). Such enhancements include (but are not limited to) support for bandwidth limited UEs, Cat-M1, and support for coverage enhancements. In particular, the term eMTC is used to separate discussion of its features from those of NB-IoT (which is a term used herein that may pertain to any Release), although the features supported by each may be similar in certain respects.

For both eMTC and NB-IoT, Cellular IoT (CIoT) Evolved Packet System (EPS) User Plane (UP) optimization and CIoT EPS Control Plane (CP) optimization signaling reductions were also introduced in Rel-13. The former, here referred to as the UP-solution, allows the UE to resume a previously stored RRC connection (thus also known as RRC Suspend/Resume). The latter, here referred to as CP-solution, allows the transmission of user-plane data over Non-Access Stratum (NAS), which is sometimes referred to as Data Over NAS (DoNAS).

Among other things, particular embodiments of the present disclosure (e.g., as implemented for eMTC and/or NB-IoT, possibly beginning with 3GPP Release 15) may reduce wireless device 120 power consumption and/or latency by allowing data to be sent as early as is possible and/or practical during the Random Access (RA) procedure. In pursuing such a goal, it may be worthwhile to evaluate power consumption/latency gain and specify necessary support for DL/UL data transmission on a dedicated resource during the RA procedure (e.g., after PRACH and/or Narrowband PRACH (NPRACH) transmission and before the RRC connection setup is completed). The RRC Suspend/Resume case may be particularly worthwhile to consider in this regard.

Figure 2:
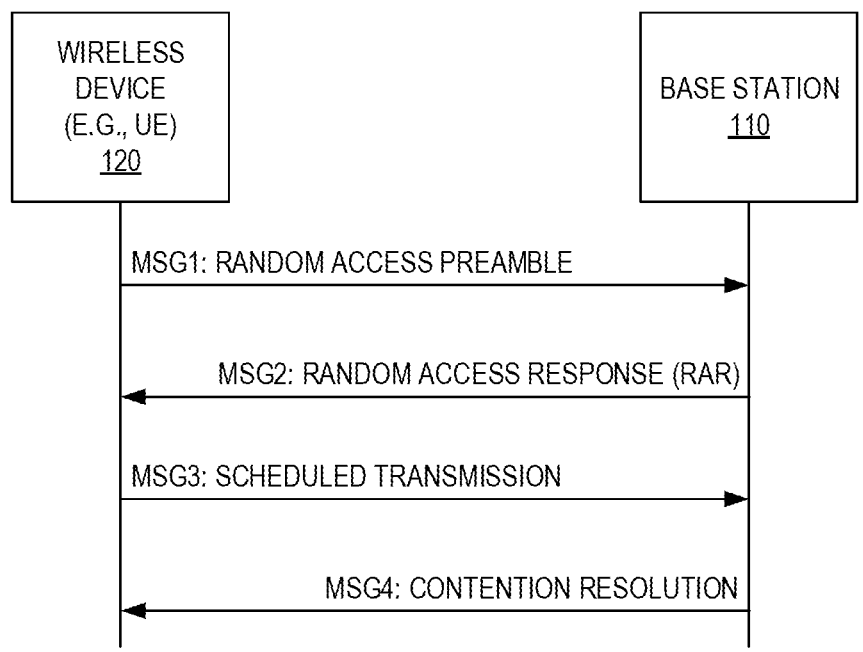
FIG. 2 is a signaling diagram illustrating an example Random Access (RA) procedure, according to one or more embodiments of the present disclosure.

The messages in the RA procedure are commonly referred to as message 1 (Msg1) through message 4 (Msg4). Contention based RA procedure consistent with one or more embodiments of the present disclosure is illustrated in FIG. 2.

Approaches to support early data transmission (EDT) (e.g., during RA) may include support for early UL data transmission in Msg4 in a Rel-13 UP solution. EDT may be enabled for UL Msg3 only, or DL Msg4 only, or both Msg3 and Msg4 depending on actual use cases. The wireless device 120 may indicate its intention of using EDT by the way it selects the preamble in Msg1. However, this may require some form of preamble partitioning, which may have a negative impact on (N)PRACH performance.

Preamble and PRACH resource partitioning/configuration and indication of Msg3 data sizes may include the wireless device 120 initiating EDT in Msg1 when the size of Msg3 (including the user data which wireless device 120 intends to transmit) is equal or smaller than the maximum possible transport block size (TBS) for Msg3 broadcast per Coverage Enhanced/Enhancement (CE) level. Additionally or alternatively, PRACH partitioning for EDT indication may be configured per enhanced coverage level.

In general, various embodiments may include or exclude certain features. For example, some embodiments may support segmentation, while others do not. Indeed, support for segmentation may not be a priority in some embodiments. In some embodiments, PRACH resource partitioning may not be supported to indicate the intended data size other than legacy or maximum TBS broadcast per CE. According to one or more embodiments, UE category is not indicated in Msg1. Further, according to one or more embodiments, for EDT indication, PRACH resources may be configured as in legacy eMTC or NB-IoT with respect to physical layer resources, preambles/subcarriers. The PRACH resource pool, i.e., physical layer resources, preambles/subcarriers, for EDT indication may be separate from PRACH resource pool for legacy RACH procedure.

In some embodiments, the grant included in RAR for Msg3 transmission may, for example, be according to section 16.3.3 of 3GPP TS 36.213 describing a narrowband RAR grant. In particular, higher layers may indicate the Nr-bit UL Grant to the physical layer, as defined in 3GPP TS 36.321.

The number of bits (Nr-bits) in the narrowband RAR grant may be 15, and the content of these 15 bits starting with the most significant bit (MSB) and ending with the least significant bit (LSB) are as follows. The first bit may indicate uplink subcarrier spacing ($\Delta f$), wherein a '0' indicates 3.75 kHz and a '1' indicates 15 kHz spacing. The next six bits may represent the subcarrier indication field (Isc) as specified in subclause 16.5.1.1 of 3GPP TS 36.213. The next two bits may represent the scheduling delay field (IDelay) as specified in subclause 16.5.1 of 3GPP TS 36.213, with k0=12 for IDelay=0, where NB-IoT DL subframe n is the last subframe in which the Narrowband Physical Downlink Shared Channel (NPDSCH) associated with the Narrowband Random Access Response Grant is transmitted. The next three bits may represent a Msg3 repetition number (NRep) as specified in Subclause 16.5.1.1 of 3GPP TS 36.213. Finally, the next three bits may represent an MCS index indicating TBS, modulation, and number of RUs for Msg3, according to Table 16.3.3-1 of 3GPP TS 36.213. The redundancy version for the first transmission of Msg3 may be 0.

Figures 3, 4:
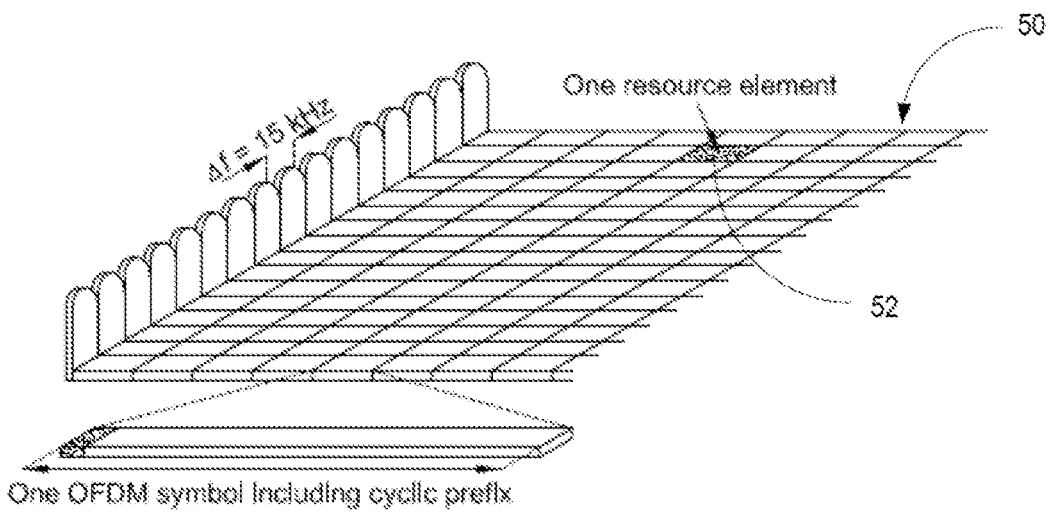
FIG. 3 is a table illustrating example Downlink Control Information (DCI) contents, according to one or more embodiments of the present disclosure.
FIG. 4 is a schematic diagram of an example time-frequency grid, according to one or more embodiments of the present disclosure.

Additionally or alternatively, the grant included in RAR for Msg3 transmission may include the example downlink control information (DCI) illustrated in FIG. 3 (which may, e.g., be specified in section 16.3.3 of 3GPP TS 36.213).

Additionally or alternatively, certain embodiments may address certain uncertainties with respect to how padding of Msg3 is performed. For example, in certain embodiments in which the UL data size is very small, Msg3 transmission may need to include a relatively large amount of padding. In general, padding may be done at the Medium Access Control (MAC) sub-layer in the process of (re)building MAC Packet Data Unit (PDU) for Msg3. The UE's MAC sub-layer may (re)build a Msg3 PDU according to corresponding UL grant(s) the UE has received.

For example, the wireless device 120 may be provided with an UL grant in Msg2 (i.e., RAR message) to transmit Msg3. The MAC sub-layer may then build a Msg3 PDU based on data from Common Control Channel (CCCH) logical channel submitted by the Radio Link Control (RLC) sub-layer and then store it in the Msg3 buffer. The MAC entity may obtain the PDU from Msg3 buffer and instruct the PHY layer to generate a transmission of Msg3 according to the received UL grant. Once the wireless device 120 transmits Msg3, it starts a timer (e.g., mac-ContentionResolutionTimer) and monitors the (N)PDCCH for receiving either Msg4 or a UL grant for Msg3 retransmission. In the case where the contention resolution in Msg4 is considered unsuccessful, the wireless device 120 may restart the RA procedure. Note that in subsequent RA attempts, the wireless device 120 may obtain the Msg3 PDU from Msg3 buffer for transmission rather than building a new one. In case of Msg3 retransmission the base station 110 may send the wireless device 120 a new UL grant via (N)PDCCH rather than a Msg4 (before the mac-ContentionResolutionTimer expires). The wireless device 120 may additionally or alternatively obtain the PDU from Msg3 buffer for retransmission using the newly provided UL grant.

According to various embodiments of EDT, Msg3 MAC PDU may be larger or smaller than the provided UL grant. For example, the wireless device 120 may receive an UL grant in Msg2 and realize that the provided grant is not sufficient to accommodate the potential Msg3 PDU (i.e., including UL data). In some such embodiments, the wireless device 120 may fallback to transmitting legacy Msg3 in some embodiments. As another example, the UL grant may be larger compared to legacy Msg3 size, which may result in unnecessary waste of resources due to padding bits. Further, UL resources may be wasted when the UL grant is larger than needed to accommodate all pending UL data. In addition, a similar situation may also happen when the wireless device 120 receives a smaller or larger UL grant to (re)transmit the Msg3 PDU already stored in Msg3 buffer. Such padding issues may happen in CP EDT solutions, UP EDT solutions, or both.

Notwithstanding the above, there may nonetheless be certain challenges. For example, two particular issues may arise in view of the size of an Msg3 grant as compared to the size of actual data to be transmitted in Msg3. The first of these issues may be due to the wireless device 120 being allocated with the actual data size being relatively much smaller (e.g., 100 bits) than what is granted for Msg3 transmission (e.g., 1000 bits), resulting in a payload of, e.g., 100 bits plus possible headers that would be padded up to 1000 bits, potentially resulting in longer transmission time (which may thereby be performed at relatively higher power consumption and/or latency, for example) and higher system resource consumption compared to what would be needed if the provided grant would be for smaller TBS. These issues are emphasized in deep coverage due to number of repetitions required. Indeed, uplink TX time may considerably affect wireless device 120 power consumption.

The second particular issue that may arise may be due to the wireless device 120 being allocated with an UL grant larger than a legacy one but which is nonetheless not sufficient to accommodate the actual data size and the wireless device 120 falls back to performing in accordance with a legacy Msg3. Using a larger than required UL grant for legacy Msg3, padding is needed in Msg3 MAC PDU, resulting in higher power consumption (and latency) and system resource consumption compared to what would be needed if either a smaller UL grant were provided, or the wireless device 120 were to not fallback to legacy Msg3 (e.g., by using segmentation).

Particular embodiments may use multiple UL resource allocation (e.g., multiple TBSs) to reduce the impact of excessive padding. For example, the base station 110 may provide multiple UL resource allocation for the wireless device 120, and the wireless device 120 may choose the closest TBS according to the data it wants to send. Accordingly, the wireless device 120 may not need to pad when the UL resource allocation is significantly larger than the data packet a wireless device 120 wants to send.

Nonetheless, certain such embodiments may themselves face certain problems and/or drawbacks. For example, some embodiments may include the wireless device 120 indicating its preferred data volume in Msg1, and the base station 110 providing UL grants in Msg2 (i.e., RAR) for the TBS allocation, with the number of repetitions indicated via DCI that schedules the RAR. This solution may not only consume excessive UL resource for Msg1, but may also introduce significant overhead at the base station 110 for the effort of blind detection. Furthermore, because the number of repetitions is indicated in DCI that schedules the RAR, the base station 110 may not be able to adjust the coverage through the number of repetitions for the UEs that share the RAR message (i.e., given that a RAR message may be transmitted to several UEs at the same time to schedule them in the UL). Solutions that effectively signal and perform UL resource allocation in the use of multiple TBS are not well understood in the art.

Certain aspects of the present disclosure and their embodiments may provide solutions to these or other challenges. Embodiments of the present disclosure propose a concrete method to provide several Msg3 TBS sizes (UL grants) in Msg2 for transmitting data during random access. The wireless device 120 may choose the TBS that best fits the data currently in its buffer. The base station 110 may then perform (blind) detection to identify the Msg3 and the attached data.

That is, particular embodiments may provide more than one TBS/UL resource allocation grant in Msg2 to the wireless device 120 to transmit data during random access in Msg3. The resource allocated for the UL Msg3 transmission may be allocated in a way to ensure minimum UL resource usage in the case of more than one TBS/UL grant is provided to the wireless device 120, and/or to ensure good detection performance at the base station 110. The wireless device 120 may choose a proper TBS that fits the data in its buffer. The base station 110 may then perform (blind) detection to identify the Msg3 and the attached data. Accordingly, excessive padding (and correspondingly, excess power consumption caused by unnecessary padding) may be reduced.

Certain embodiments may provide one or more of the following technical advantage(s). For example, excessive padding (and correspondingly, excess power consumption caused by unnecessary padding) may be reduced by certain embodiments. One or more embodiments discussed herein may additionally or alternatively optimize the UL resource allocation and/or reduce DL signaling overhead when providing the UL resource allocation, which may be particularly important in NB-IoT and/or eMTC given that UL and DL resources are limited in these contexts as compared with legacy LTE, for example.

Radio communication between the base station 110 and the wireless device 120 may be performed using radio resources across a time and frequency domain. For example, NB-IoT may use Orthogonal Frequency-Division Multiplexing (OFDM) in the downlink and Discrete Fourier Transform (DFT) spread OFDM in the uplink. A basic downlink physical resource may be viewed as a time-frequency grid. FIG. 4 illustrates a portion of an example OFDM time-frequency grid 50. According to this example, the time-frequency grid 50 is divided into one millisecond subframes. Each subframe includes a number of OFDM symbols. For a normal cyclic prefix length, suitable for use in situations where multipath dispersion is not expected to be extremely severe, a subframe may comprise fourteen OFDM symbols. A subframe may comprise twelve OFDM symbols if an extended cyclic prefix is used. In the frequency domain, the physical resources shown in FIG. 4 are divided into adjacent subcarriers with a spacing of 15 kHz. The number of subcarriers may vary according to the allocated system bandwidth. The smallest element of the time-frequency grid 50 is typically referred to as a resource element 52, which comprises one OFDM subcarrier during one OFDM symbol interval. One way to identify a particular resource element within a subframe is by its time-position (i.e., t-position) and frequency-position (i.e., f-position) in the grid.

NB-IoT may use a similar time-frequency grid for the downlink 140, e.g., including twelve 15 kHz adjacent subcarriers for a total of 180 kHz. According to NB-IoT, a resource unit (RU) is a unit that maps to a transport block. The dimensions of an RU may vary depending on the (N)PUSCH format and subcarrier spacing. For example, when using NPUSCH format 1 with 3.75 kHz subcarrier spacing, an RU may be one subcarrier wide and 16 time slots long. Other NPUSCH formats and/or subcarrier spacings may use differently sized RUs.

Figure 5:
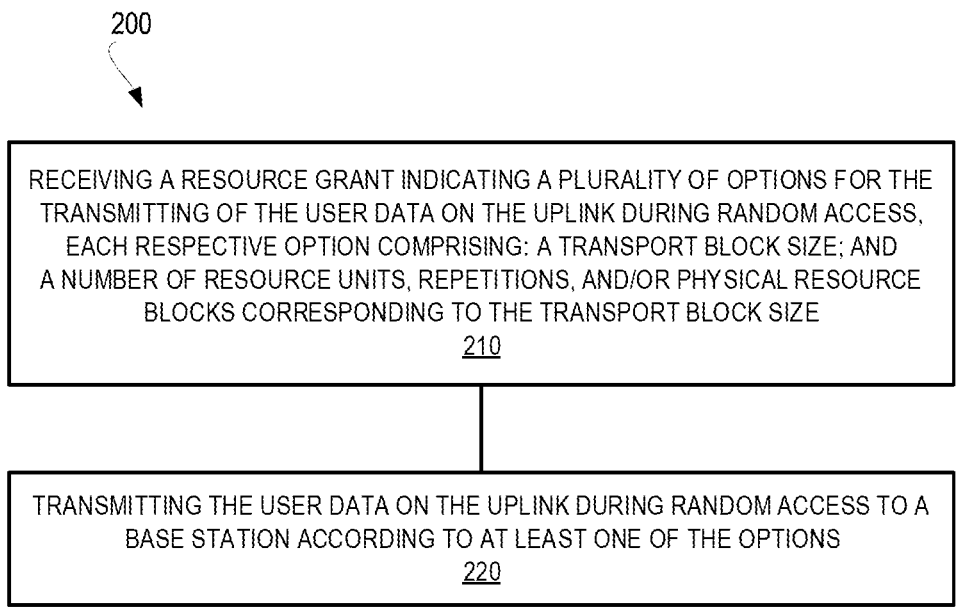
FIGS. 5 and 6 are flow diagrams illustrating example methods, each according to one or more embodiments of the present disclosure.

Particular embodiments of the present disclosure include a method 200 performed by a wireless device 120 for transmitting user data on an uplink 130 during random access, e.g., as illustrated in FIG. 5. The method 200 comprises receiving a resource grant indicating a plurality of options for the transmitting of the user data on the uplink 130 during random access (block 210). Each respective option comprises a transport block size, and further comprises a number of resource units, repetitions, or physical resource blocks corresponding to the transport block size. The method 200 further comprises transmitting the user data on the uplink 130 during random access to a base station 110 according to at least one of the options (block 220).

Figure 6:
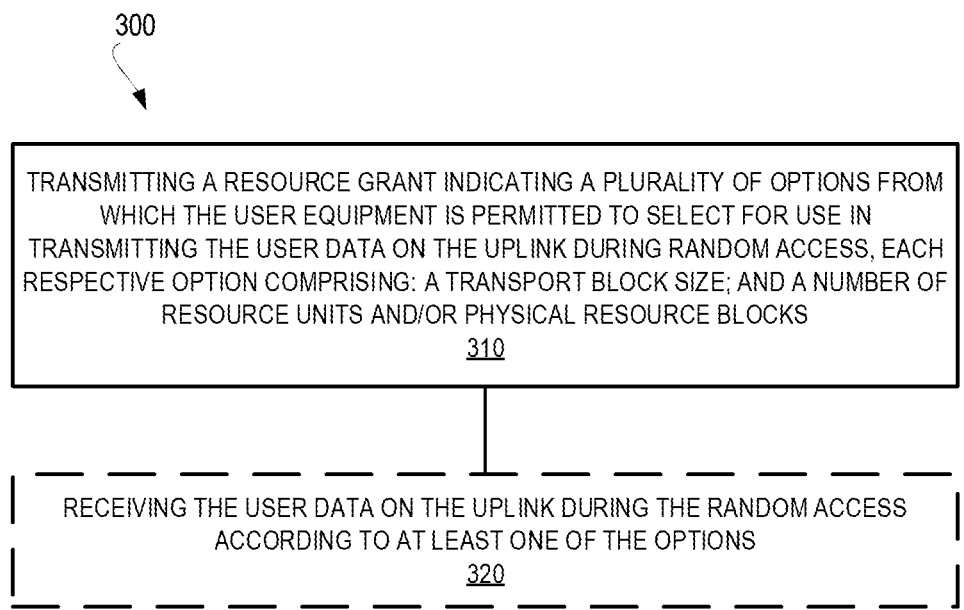

Other embodiments include a method 300 performed by a base station 110 for enabling a user equipment 120 to transmit user data on an uplink 130 during random access, e.g., as illustrated in FIG. 6. The method 300 comprises transmitting a resource grant indicating a plurality of options from which the user equipment 120 is permitted to select for use in transmitting the user data on the uplink 130 during random access (block 310). Each respective option comprises a transport block size, and further comprises a number of resource units, repetitions, or physical resource blocks corresponding to the transport block size. In some embodiments, the method 300 further comprises receiving the user data on the uplink 130 during the random access according to at least one of the options (block 320).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
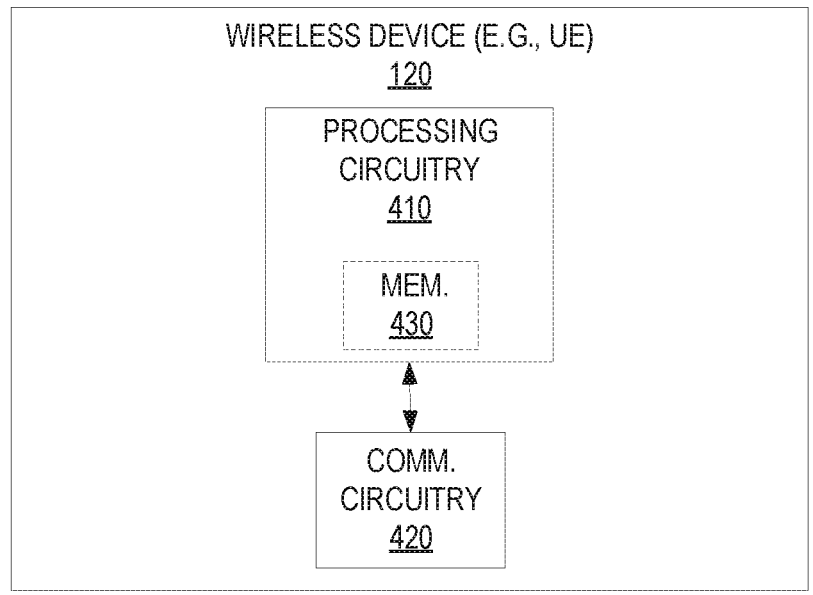
FIGS. 7 and 8 are schematic block diagrams illustrating an example wireless device (e.g., UE), according to one or more embodiments of the present disclosure.

FIG. 7 for example illustrates a wireless device 120 as implemented in accordance with one or more embodiments. As shown, the wireless device 120 includes processing circuitry 410 and communication circuitry 420. The communication circuitry (e.g., radio circuitry) 420 is configured to transmit and/or receive information to and/or from one or more other nodes, e.g., via any communication technology. Such communication may occur via one or more antennas that are either internal or external to the wireless device 120. The processing circuitry 410 is configured to perform processing described above, such as by executing instructions stored in memory 430. The processing circuitry 410 in this regard may implement certain functional means, units, or modules.

Figure 8:
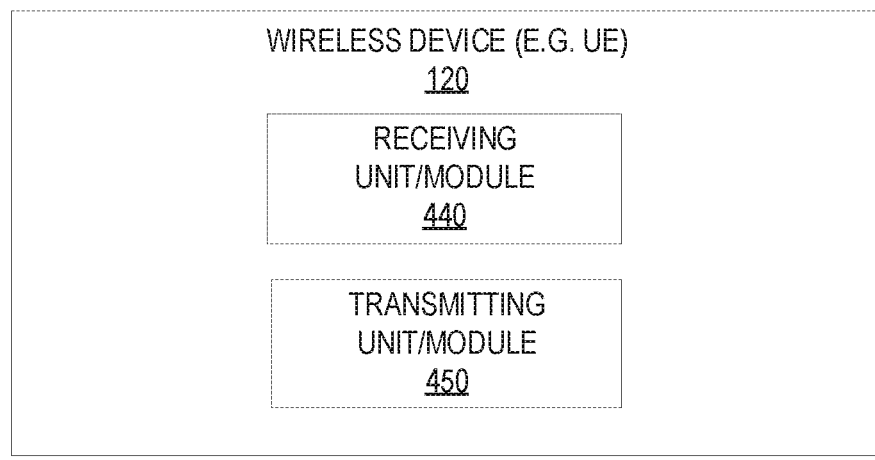

FIG. 8 illustrates a schematic block diagram of a wireless device 120 in a wireless network according to still other embodiments (for example, the wireless network shown in Figure QQ1). As shown, the wireless device 120 implements various functional means, units, or modules, e.g., via the processing circuitry in FIG. 7 and/or via software code. These functional means, units, or modules, e.g., for implementing the method(s) herein, include for instance: a receiving unit or module 440, and a transmitting unit or module 450. The receiving unit or module 440 is configured to receive a resource grant indicating a plurality of options for the transmitting of the user data on the uplink 130 during random access. Each respective option comprises a transport block size, and further comprises a number of resource units, repetitions, or physical resource blocks corresponding to the transport block size. The transmitting unit or module 450 is configured to transmit the user data on the uplink 130 during random access to a base station 110 according to at least one of the options.

Figure 9:
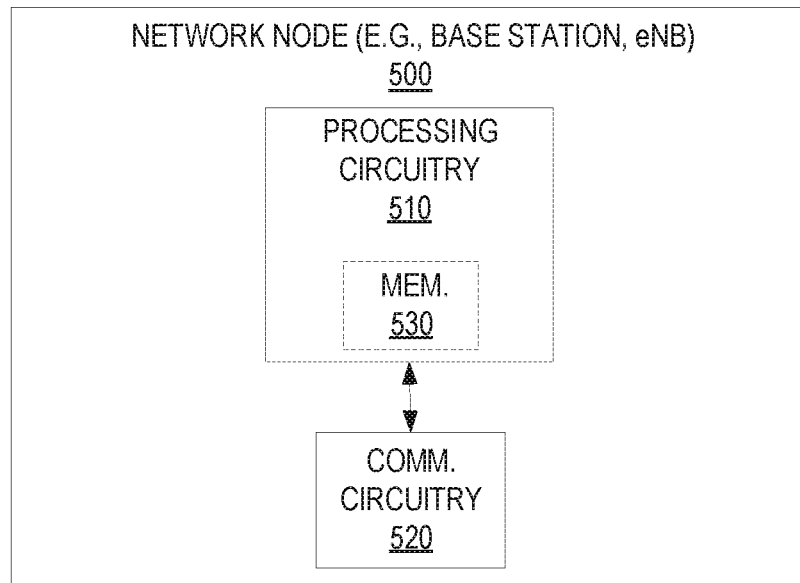
FIGS. 9 and 10 are schematic block diagrams illustrating an example network node (e.g., base station, eNB), according to one or more embodiments of the present disclosure.

FIG. 9 illustrates a network node 500 (e.g., a base station 110, eNB) as implemented in accordance with one or more embodiments. As shown, the network node includes processing circuitry 510 and communication circuitry 520. The communication circuitry 520 is configured to transmit and/or or receive information to and/or from one or more other nodes, e.g., via any communication technology. The processing circuitry 510 is configured to perform processing described above, such as by executing instructions stored in memory. The processing circuitry 510 in this regard may implement certain functional means, units, or modules.

Figure 10:
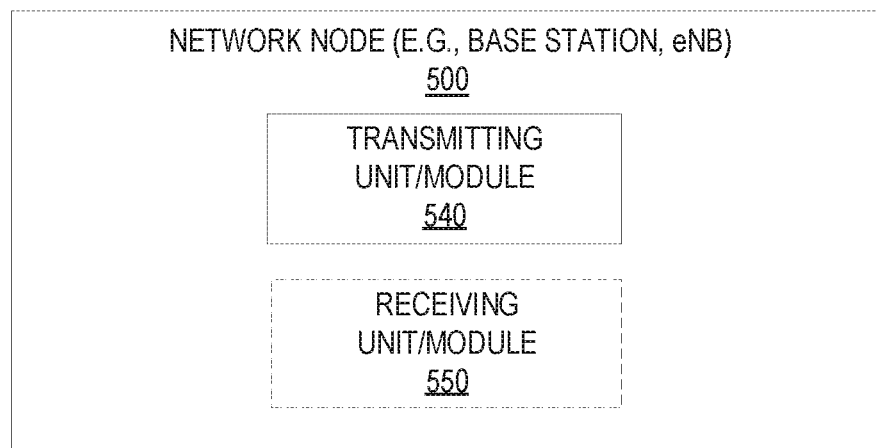

FIG. 10 illustrates a schematic block diagram of a network node 500 (e.g., base station 110, eNB) in a wireless network according to still other embodiments (for example, the wireless network shown in FIG. QQ1). As shown, the network node 500 implements various functional means, units, or modules, e.g., via the processing circuitry 510 in FIG. 9 and/or via software code. These functional means, units, or modules, e.g., for implementing the method(s) herein, include for instance a transmitting unit or module 540. Some such embodiments further comprise a receiving unit or module 550. The transmitting unit or module 540 is configured to transmit a resource grant indicating a plurality of options from which the user equipment 120 is permitted to select for use in transmitting the user data on the uplink 130 during random access. Each respective option comprises a transport block size, and further comprises a number of resource units, repetitions, or physical resource blocks corresponding to the transport block size. The receiving unit or module 550 (i.e., if included in the particular embodiment) is configured to receive the user data on the uplink 130 during the random access according to at least one of the options.

Other embodiments herein include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

The following embodiments may be particularly useful for NB-IoT:

A typical NB-IoT system may, for example, use a fixed Msg3 size of 88 bits. The MCS, TBS and number of resource units (RUs) used for Msg3 may be determined by using the table illustrated in FIG. 11 (e.g., consistent with NB-IoT Rel-13), or another table as may be found, e.g., in Table 16.3.3-1 of TS 36.213.

As shown in the example of FIG. 11, only one TBS is supported in such a system, and the modulation and number of RUs are adjustable by the base station 110 to indicate the MCS index in the UL grant.

An 88-bit TBS may not be enough to transmit data during random access in Msg3. It may also not be resource efficient for the wireless device 120 to indicate its uplink buffer size to the base station 110. Such may also increase complexity of random access and associated signalling. Hence, it may be difficult for the base station 110 to determine the exact UL resource that needs to be allocated to a wireless device 120. As previously discussed, if more resource is allocated to the wireless device 120, the wireless device 120 may need to pad the unused resource, which uses more radio resources and power than may be necessary, particularly if the allocated resource is significantly larger than what the wireless device 120 needs.

Embodiments of the present disclosure provide multiple UL resource choices (e.g., in terms of TBS, RUs, modulation orders) for the wireless device 120 to select the best option (e.g., autonomously). That is, the wireless device 120 may choose the most appropriate UL resource to send its UL data in Msg3.

Achieving flexibility in making such a determination may result in numerous information bits being transmitted in Msg2 to indicate the available choices. This may increase the size of Msg2, which may cause backward compatibility issues. Embodiments of the present disclosure resolve this problem, e.g., by reducing the number of bits used in Msg2 to indicate the UL resource allocation. Embodiments additionally or alternatively provide several UL allocation candidates for the wireless device 120 to choose from and/or help reduce UL resource usage in the system.

Allocation of the UL resources that can be used as candidates for the UL Msg3 transmission may be performed in several possible ways, according to particular embodiments. For example, some embodiments align the starting points of UL resources 150a, 150b, 150c, such that the UL resources start at the same time and frequency indicated in Msg2, but each may have a different length in time, e.g., in terms of the number of repetitions required with respect to different TBS's to be transmitted. An example of this is illustrated in FIG. 12A. Note that the UL resources 150a-c may each, for example, comprise any number of resource elements 52.

Other embodiments may include a fixed or configurable timing offset between each of the UL resources 150a-c as shown below, where either a time offset (e.g., FIG. 12B), frequency offset (e.g., FIG. 12C), or both a time offset and frequency offset (e.g., FIG. 12D) are added between different allocated UL resources 150a-c.

Figure 12D:
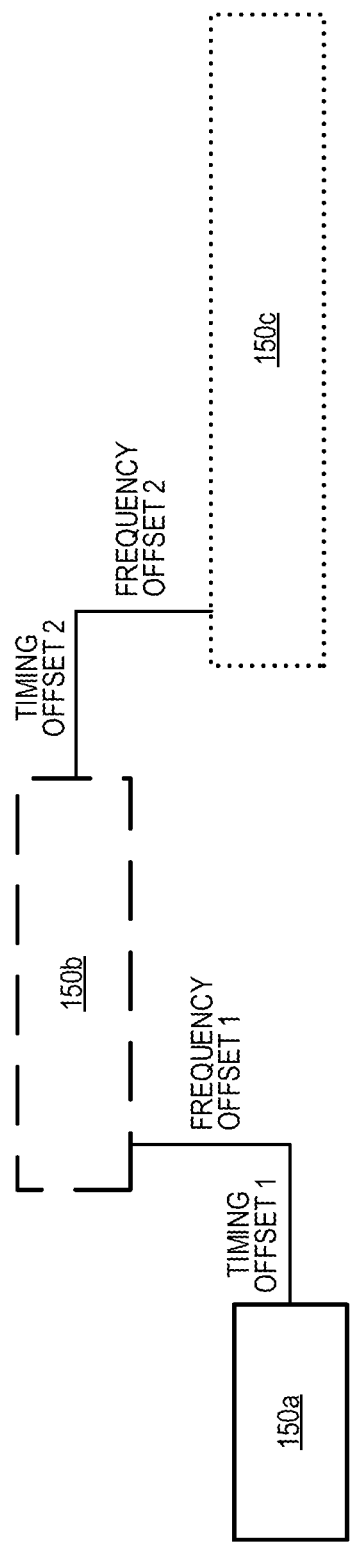
Figure 12E:
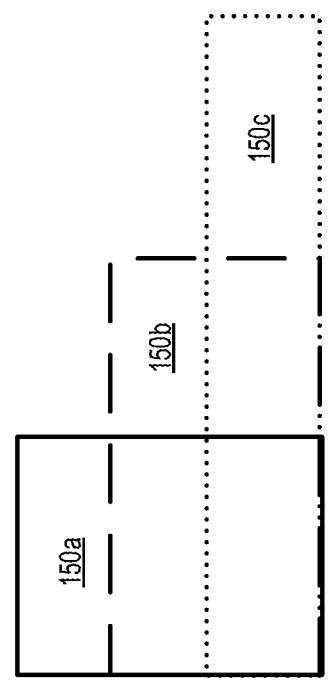

Other embodiments include a same starting time of the Msg3 PUSCH for all the UL resources 150a-c, but each may have a different number of PRBs in frequency and/or length in time, as shown in FIG. 12E.

Note that although the examples of FIGS. 12A-E each illustrate three different UL resources 150a-c, other embodiments may include a different number of UL resources 150.

Embodiments may have separate MAC RA response messages for legacy UEs and EDT UEs, e.g., allowing for a larger RAR size and still maintaining backwards compatibility. Such embodiments may provide a supplemental or alternative means for providing the UL grant information for multiple UL grants in one or more of the embodiments described herein.

The multiple UL resources may need to not only be allocated, but also signalled to the wireless device 120. This signalling may be performed in numerous ways, according to particular embodiments.

For example, a first embodiment for signalling the UL resources to the wireless device 120, may assume the number of UL subcarriers used for all the candidate UL resources is the same (e.g., consistent with NB-IoT). This assumption may reduce detection complexity at the base station 110. Each of the candidate UL resource may be defined by a TBS, a number of resource units (RUs), and a number of repetitions. The number of RUs depends on the number of subcarriers used. Notice that in NB-IoT, a TBS is mapped to an RU first, and if necessary, the RU is repeated (for enhanced coverage). That is, RUs were introduced due to the narrow transmission bandwidth and the number of RUs varies according to the TBS. For example, if a low code rate is needed, the TBS can be mapped to more RUs, and vice versa. The repetition is applied to the RUs to achieve a desired coverage, if it is deemed to be necessary by the base station 110.

Therefore, embodiments provide, e.g., a table with MCS-indexes, for the UL grant pre-configuration with different candidate TBSs and corresponding number of RUs. According to such embodiments, (TBS, RUs) pairs are predefined. An index to a table which points to several of the (TBS, RUs) pairs to the wireless device 120 as a bundled configuration may then be signalled, for example. The wireless device 120 may then choose one of the pairs for its UL Msg3 transmission. In at least some embodiments, these (TBS, RUs) pairs may result in a similar code rate such that a common number of repetitions (e.g., signaled separately) may be applied by the base station 110 to adjust the coverage.

FIG. 13 illustrates a non-exclusive example of this approach. Other embodiments may include one or more tables any of which may be in a different format from the example provided below. Also certain embodiments may instead reuse the reserved entries in Table 3 (e.g., in accordance with section 16.3.3-1 of 3GPP TS 36.213), this may be limiting since an EDT wireless device 120 may be unable to transmit any user-plane data with a small grant size of 88 bits. Examples in accordance with FIG. 13 are not limited in this way.

In the example of FIG. 13, 5 bits are used to signal any of up to 32 different MCS indices. In this example, each MCS index entry corresponds to, at most, 3 different (TBS, RUs) pairs, which have similar code rate. That is number of RUs 1 corresponds to TBS1, RUs 2 corresponds to TBS2, and RUs 3 corresponds to TBS3. It is also possible to have a different number of (TBS, RUs) pairs defined by each entry (i.e., rather than the 3 shown in this example).

In one embodiment, the five bits used to signal the MCS includes a bit from the uplink carrier spacing field, and a bit from the subcarrier indication field. The bits from these fields may be used to supplement three bits ordinarily used to signal MCS in legacy grant signalling to support the signalling of larger number of MCS indices. Such an approach may assume 15 kHz subcarrier spacing, such that uplink carrier spacing is not needed. Further, with 15 kHz spacing, only 5 bits are needed for signaling possible subcarriers. The order of the bit fields of the grant for embodiments of the present disclosure may be different from legacy, or the legacy fields may be interpreted in the way described above by combining different bit locations. As an example, the uplink carrier spacing field may be used to signal the most significant bit (MSB) of the MCS, one bit of the subcarrier indication field may be used to signal the second most significant bit of the MCS, and the 3 bits typically used to signal the MCS index (e.g., in legacy signalling) may be used to signal the least significant bits (LSB). Other embodiments may signal the MCS in other ways.

The above assumes the same frequency-position and same time start position as indicated, e.g., in FIG. 12A. If it is not the case that all grants have the same f- and t-position, additional bits may be required to specify, e.g., the f- and t-position of grants 2 and 3. That is, if 3 bits are sufficient for configuring the multi-grant table (e.g., such as the one shown in FIG. 13), 2 bits may be used as an index to point out 4 different pre-configurations with frequency and/or time offsets for the other multi grants relative to a first multi grant. For example, if the number of UL resources allocated in the UL grant is 3 as in the table illustrated in FIG. 13, but only 3 bits are used for the selection, 2 bits could be used to specify the time offset relative to grant 1 according to the table illustrated in FIG. 14.

That is, if Msg3 grant 1 has start time t0 as specified as in legacy Rel-13, grant 2 would have start time t0+Δt, and grant 3 would have start time t0+2*Δt. The value of Δt is signaled from the network, e.g., by using the table illustrated in FIG. 14.

In alternate embodiments of this solution, n bits out of the possible 15 bits used in the legacy grant in RAR may indicate the MCS index. With n bits, $n^2$ different combinations of (modulation) RUs and TBS could be signaled (with Table 1 showing example of n=5, as discussed above). In particular, the reserved bits of such a legacy grant may be used to signal offsets for f- and t-positions.

The base station 110 may select the MCS index (table entry) to be provided to the wireless device 120 in RAR depending on one or more of the following:
  Channel conditions, e.g. radio network load or estimate from Msg1 reception.
  Number of Msg3-grants that can be handled by base station 110 (i.e. table entries could be repeated with different number of Msg3-grants.)
  Commonly used EDT size used in the operators network, i.e. allow for 'repeated' table entries with focus on higher or lower TBSs.
  Other factors In another embodiment, the number of (TBS, RUs) pairs can vary among a predefined set of values, for example {2,3,5}. This number of pairs can be adaptively decided by the base station 110 and signaled to UEs, e.g., via cell-specific signaling based on, for example, the commonly used EDT TBS in the network and/or desired additional complexity from blind decoding of received Msg3. For the considered example, there can have 3 pre-defined tables, similar in form to that depicted in Table 3, and corresponding to three cases of 2, 3 or 5 choices of TBS the wireless device 120 may select from. This may allow for the adaptive adjustment (reconfiguration) of granularity level in providing multiple UL grants for Msg3 taking into account the decoding overhead and wireless device 120 behavior when in selecting EDT grant, that in turn helps improve the efficiency of EDT.

Another way to signal the Msg3 multi-grant information is to signal part of the information (e.g., information in Table 3) in the system information (SI), and more information (e.g., the MCS index) in a RAR message (i.e., Msg2) to the wireless device 120. Whether a cell supports EDT may also be indicated in the SI, though this indication need not be explicit. Thus, according to particular embodiments, this SI may include a one or more bits to indicate the supported TBSs. The SI may further indicate the modulation and number of RUs. The supported values may be chosen from a set of predefined values, e.g., in a table, but only the values indicated in the SI are supported in the cell. Then in the RAR message to a specific wireless device 120, the base station 110 may indicate which UL grants (pre-defined in SI) the wireless device 120 may select from for the transmission of Msg3. Each of the UL resources may have a corresponding entry in the information indicated in the SI. The number of subcarriers and number of repetitions may be the same or different for each of the UL resources, according to the particular embodiment.

FIG. 15 illustrates a non-limiting example of such signalling as may be found, e.g., in an NB-IoT system. The base station 110 signals the values in the table illustrated in FIG. 15 that can be used for user data transmission in Msg3.

In the RAR message to the wireless device 120, the base station 110 may further indicate which of the TBS(s) may be used by the wireless device 120 for Msg3 PUSCH, e.g., as illustrated in the non-limiting example of FIG. 16.

Accordingly, embodiments may provide the wireless device 120 with less choice than what the cell supports, e.g., based on:
  Channel conditions.
  Number of Msg3-grants that can be handled by base station 110 (i.e. table entries could be repeated with different number of Msg3-grants.)
  Commonly used EDT size used in the operators network, i.e. allow for 'repeated' table entries with focus on higher or lower TBSs.
  Other factors This solution may use fewer bits in the RAR as compared to indicating an MCS index that indicates TBS, modulation, and number of RUs for Msg3. Therefore, it is possible to signal different number of subcarriers, and/or number of repetitions for each of the UL resources. In this solution it is possible to use similar format as the legacy grant format (as discussed above) without increasing the size of RAR.

If the same frequency and time position for the multi-grants are not assumed (as in certain embodiments discussed above), the table in FIG. 15 may, in an alternative embodiment, be extended to cover the relative time or frequency position of the grants, or a separate entry in the table of FIG. 16 may indicate a lack of dependency between, e.g., the TBS and the time offset. Another advantage of embodiments that use this particular type of signalling (e.g., as compared to one or more embodiments discussed above) is that the TBS or grant information given in the table of FIG. 15 may be set to any values. For example, such values may be updated over time or set differently in different cells or by different operators.

Yet other embodiments of the present disclosure only signal the largest (TBS, RUs) and the number of UL resources to the wireless device 120. The wireless device 120 then derives the smaller (TBS, RUs) pairs implicitly. The relationship between the largest (TBS, RUs) and the smaller one(s) may be predefined in the spec, e.g., by means of a function. For example, the base station 110 may indicate that the largest usable (TBS, RUs) is (1000, 7) as shown in the table of FIG. 17 (or other table, e.g., Table 16.5.1.2-2 of 3GPP TS 36.213), and further indicate that the wireless device 120 has two additional choices with smaller TBSs together with an offset between the two consecutive grants (e.g., an offset of 3 in this example). Then the wireless device 120 may then derive the two smaller grants as (504, 4), and (176, 2).

More generally, a table (e.g., such as that in FIG. 17) may be used to indicate one of the (TBS, RUs) entries (e.g., the largest or the smallest, according to particular embodiments). If this entry is unique, the wireless device 120 may locate the other (TBS, RUs) as being in the same row as the indicated (TBS, RUs) entry.

In one example embodiment the largest grant may be given with legacy signaling, and the offset for the smaller (TBS, RUs) pair(s) may be specified in System Information.

Alternatively, in some embodiments, a linear function is used to derive the smaller (TBS, RUs) based on the largest (TBS_largest, RUs_largest). For example, if two smaller (TBS, RUs) pairs are supported in addition to the largest (TBS_largest, RUs_largest), the two smaller (TBS, RUs) pairs may be derived according to, e.g., the formulas:
  round(TBS_largest/2), round(RUs_largest/2); and
  round(TBS_largest/3), round(RUs_largest/3).

According to another example in which two smaller (TBS, RUs) pairs are supported in addition to the largest (TBS_largest, RUs_largest), the two smaller (TBS, RUs) pairs may be derived according to, e.g., the formulas:
  round(TBS_largest/N), round(RUs_largest/N); and,
  round(TBS_largest/(N−1)), round(RUs_largest/(N−1))
where N is the number of signaled uplink resource allocation candidates. In this particular example, N=3.

Other embodiments may include other formulae or mechanisms for determining one or more (TBS, RUs) pairs. Particular embodiments may additionally or alternatively use the minimum viable packet as a parameter or factor in deriving the possible TBS. For example, the entry in the row of the table of FIG. 17 may begin with the minimum viable packet, but may correspond to different granularities in the row or otherwise.

One particular example may use, e.g., a linear function to derive the larger (TBS, RUs) based on the minimum viable packet (TBS_minimum, RUs_minimum) by using similar methods stated above.

Certain embodiments discussed above assume that the size of the RAR remains the same as in legacy implementations, e.g., to allow for multiplexing of legacy and EDT UEs in the same MAC RA response message. In some embodiments, a legacy wireless device 120 may have to be able to "read past" other RARs when looking for its own RAR given by Random Access Preamble Identifier (RAPID). Alternatively, separate RA response messages for legacy UEs and EDT UEs are used within the RAR window. That is, an EDT wireless device 120 which has transmitted Msg1 on a EDT NPRACH resource may ignore the legacy RA response message and look for the new EDT RA response message. A new MAC header or different RAPIDs may be introduced for this purpose. In this case, many of the embodiments discussed above may be implemented without being restricted by size constraint. Indeed, the new EDT RAR may have any size, depending on the particular embodiment. In one embodiment, the separate RAR message may be in the padding region of the MAC PDU.

The following embodiments may be particularly useful for BL/CE UEs (eMTC, LTE-M):

Typical eMTC systems have a maximum size for Msg3 of 712 bits for BL/CE UEs in CE mode A, and 328 bits for BL/CE UEs in CE mode B. The table in FIG. 18 shows an example of definitions of the UL grant field in the MAC RAR for BL/CE UEs. The MCS/TBS fields correspond to a maximum UL TBS of 712 bits for CE mode A and 328 bits for CE mode B.

As previously discussed, this maximum may not be large enough to exploit the benefit of EDT. One option to address this may be to increase the maximum bits for Msg3, e.g., to 1000 bits for PRACH CE level 0 & 1 ("CE mode A") and 936 bits for PRACH CE levels 2 & 3 ("CE mode B"). Since the wireless device 120 is in idle mode, the wireless device 120 may not be able to report its uplink buffer size to the base station 110, and hence the base station 110 may have difficulties in determining the exact UL resource (TBS size) that needs to be allocated to a wireless device 120. As discussed above, if more resource is allocated to the wireless device 120, then the wireless device 120 may need to pad the unused resource, which may use excessive radio resources and power if the allocated resource is significantly larger than what the wireless device 120 needs.

Embodiments of the present disclosure provide multiple UL resource choices (e.g., in terms of TBS/MCS, number of repetitions for Msg3 PUSCH) for the wireless device 120 to autonomously select the best option. The wireless device 120 may choose the most appropriate UL resource to send its UL data in Msg3. Certain embodiments may require many additional bits of information in Msg2 to indicate these choices. However, increasing the size of Msg2 may cause backward compatibility issues (i.e., because the MAC RA response message contains multiple RARs, including both EDT and legacy UEs, the RAR size cannot change). Also, since the wireless device 120 would only choose one of the UL resources, it may be a waste of resource if excessive UL resources are reserved but not used (or only a small portion is used) by the wireless device 120.

Embodiments of the present disclosure reduce or minimize the message size in the UL grant carried by Msg2 and/or provide several UL allocation candidates for the wireless device 120 to choose from. Embodiments may additionally or alternatively aid in reducing or minimizing the UL resource usage in the system.

Allocation of the UL resources as candidates for the UL Msg3 transmission may be performed in various ways, according to particular embodiments (e.g., as described above with respect to FIGS. 12A-E). As described above, in one such embodiment, the starting points of the resources are aligned as illustrated in FIG. 12A. That is, the Msg3 PUSCH Resource allocation indicates the same frequency resources for all the UL resources, but each of them has a different length in time, defined, e.g., by different number of repetitions.

Other embodiments include one or more fixed or configurable timing offsets between each of the UL resources. The timing offset(s) may include a time offset (e.g., as shown in FIG. 12B), a frequency offset (e.g., as shown in FIG. 12C), or both a time and frequency offset (e.g., as shown in FIG. 12D) which are added between different allocated UL resources, similar to embodiments discussed above. Other embodiments include a same starting time of the msg3 PUSCH for all the UL resources, but each may have a different number of PRBs in frequency and/or length in time, as shown in FIG. 12E.

In another embodiment it is proposed to have separate MAC RA response messages for legacy UEs and EDT UEs, allowing for a larger RAR size and still maintaining backwards compatibility.

In addition to allocating the resources, the multiple UL resource allocation may need to be signalled to the wireless device 120 in particular embodiments. The following paragraphs discuss examples of such embodiments in which the multiple UL resource allocation grants are signalled to the wireless device 120.

In particular, each of the candidate UL resources may be defined by a TBS/MCS, the allocated frequency resources (in terms of PRBs), and a number of repetitions. In eMTC, a TBS may be mapped to one or more PRBs in the frequency domain first, and repetitions may be used for enhanced coverage if needed or desired.

When a smaller TBS is mapped to the same number of PRBs in the frequency domain, the code rate is lower. Therefore, less number of repetitions are generally needed in order to achieve the same coverage.

Accordingly, embodiments of the present disclosure include a table for the UL grant pre-configuration with different indexes corresponding to different candidate TBSs and corresponding number of repetitions, assuming the same number of PRBs are used in the frequency domain. In such embodiments, (TBS, number of repetitions) pairs are defined and signalled to a wireless device 120 as a bundled configuration, e.g. using an index to the table which points to several of the (TBS, number of repetitions) pairs. The wireless device 120 can choose one of them for its UL Msg3 transmission. These (BS, number of repetitions) pairs should result in similar coverage. Although the table in FIG. 19 illustrates an example of such a table, other embodiments may include other formats, values, and/or fields, for example.

In the example of FIG. 19, five bits are used to signal one of up to 32 different indices. In this example, each MCS index entry corresponds to at most 3 different (TBS, Number of repetitions for TBS) pairs.

In the example given in the table of FIG. 19, the number of repetitions may be explicitly signaled for each of the TBSs. Other embodiments may signal/derive the number of repetitions implicitly, e.g., based on the configured maximum number of repetitions for PUSCH. The table in FIG. 20 illustrates another non-exclusive example in which the maximum number of configured repetitions in the cell is Y. There may be two values of Y signaled also, e.g., one for CE mode A and another for CE mode B. If the final results in the entry of the number of repetitions is not an integer, the number of repetitions may be rounded up or down to provide an appropriate integer number.

In these examples, five bits are used to signal the MCS index. In one such embodiment, two additional bits are used as compared to a legacy grant (which is typically 3 bits). In some embodiments, these two additional bits are taken from the 'Msg3 PUSCH Resource allocation' field, leaving only the larger resource allocations which are most relevant for the larger TBS sizes. The order of the bit fields of the grant may be different from legacy, or may be interpreted differently from the legacy fields, e.g., by combining different bit locations. As an example, the subcarrier indication field may be the most significant bit (MSB) of the MCS index, one bit of the subcarrier indication field may be the second most significant of the MCS index, and the 3 bits of the legacy MCS index would be used as the least significant bits (LSB).

Alternatively (e.g., if these additional bits are not available), the tables in FIGS. 19 and 20 may contain fewer entries and use a 3 bit index for CE mode A, or 2 bits for CE mode B. In some embodiments, the TBS values for EDT for CE mode A and B are in accordance with the table illustrated in FIG. 33.

Embodiments described above may use the same frequency-position and same time start position, e.g., as shown in FIG. 12A. Alternatively (i.e., if the multiple grants do not each have the same f- and t-position), additional bits may be required to specify, e.g., the f- and t-position of additional grants (e.g., grants 2 and 3). That is (for example), if 3 bits would be sufficient for configuring the multi grant in the table of FIG. 19, two bits may be used as an index to point out 4 different pre-configurations with frequency and time offsets for the other multi grants relative to a first multi grant. For example, if the number of multigrants is 3 as in the table of FIG. 11, but only 3 bits used for the selection, 2 bits could be used to specify the time offset relative to grant 1 according to the table in FIG. 14.

That is, if Msg3 grant 1 has start time $t_0$ (e.g., as specified as in legacy Rel-13), grant 2 would have start time $t_0 + \Delta t$, and grant 3 would have start time $t_0 + 2*\Delta t$.

Alternatively, n bits out of the possible m total bits (e.g., m=20 or m=12) may be used in a RAR grant to indicate the MCS index. With n bits, $n^2$ different combinations of (modulation, Number of Repetitions for Msg3 PUSCH) and TBS could be signaled (with Table 2 showing example of n=5, as discussed above).

The base station 110 may select the MCS index (table entry) to be provided to wireless device 120 in RAR depending on one or more of the following:

Channel conditions, e.g. radio network load or estimate from Msg1 reception.

Number of Msg3-grants that can be handled by base station 110 (i.e. table entries could be repeated with different number of Msg3-grants.)

Commonly used EDT size used in the operators network, i.e. allow for 'repeated' table entries with focus on higher or lower TBSs.

Other factors

Alternatively, instead of fixing the Msg3 PUSCH resource allocation, we can fix the number of repetitions, and use different number of PRBs for different TBS to adjust the code rate. Notice up to 6 PRBs can be allocated to one wireless device 120 for its Msg3 PUSCH transmission.

Therefore, we can provide, e.g., a table with indexes, for the UL grant pre-configuration with different candidate TBSs and corresponding number of PRBs used in the frequency domain, assuming the same number of repetitions is used in time. The basic idea here is to pre-define (TBS, number of PRB) pairs, and signal, e.g. an index to a table which points to the several of the (TBS, number of PRB) pairs to the wireless device 120 as a bundled configuration. The wireless device 120 can choose one of them for its UL Msg3 transmission. These (BS, number of PRB) pairs should result in similar coverage. The table of FIG. 21 is a non-limiting example of such. Other embodiments may be in other formats. In this example, 5 bits are used to signal 32 different indices, and each MCS index entry corresponds to at most 3 different (TBS, Number of PRB) pairs.

Notice that for BL CE/UEs, the starting PRB of a PUSCH resource allocation can be any of the 6 PRBs in the frequency domain. The same mechanism of indicating the starting PRB can be used here for EDT in Msg3. But the number of continuous allocation PRB is restricted by the starting PRB. We can either explicitly include the starting PRB information in the table, or we can use an indirect way to derive this, e.g., by using a function, or we simply fix the starting PRB in the spec.

Another way to signal the multiple UL resource allocations for Msg3 is to signal part of the information in the system information (SI), and more information is signaled in RAR message (i.e., Msg2) to the wireless device 120. Whether a cell supports EDT needs to be indicated in the SI, e.g., when some preambles for Msg1 are reserved for EDT. Therefore, in this system information, we can use a few bits to indicate the supported TBSs, and possibly the modulation and number of repetitions. The supported values are chosen from a set of predefined values, e.g., in a table. But only the indicated values in the SI are supported in the cell. Then in the RAR message to a specific wireless device 120, base station 110 can indicate which UL grants (pre-defined in SI) the wireless device 120 can select from for the transmission of Msg3, each of the UL resource has a corresponding entry in the information indicated in the SI. The number of PRBs and number of repetitions can be the same or different for each of the UL resource.

In an eMTC system, the following non-exclusive example illustrates an embodiment of the idea. First in the SI, the base station 110 signals the values in the table of FIG. 22 that can be used for user data transmission in Msg3.

In the RAR message to the wireless device 120, the base station 110 further indicates which of the TBS(s) can be used by the wireless device 120 for Msg3 PUSCH, together with the Msg3 PUSCH resource allocation, and number of repetitions for Msg3 PUSCH. The table in FIG. 16 gives a non-exclusive example.

There are several ways to signal the Msg3 PUSCH resource allocation, and number of repetitions for Msg3 PUSCH. For example, for each TBS the corresponding Msg3 PUSCH resource allocation can be signalled explicitly, as well as the number of repetitions for Msg3 PUSCH, or (for example) one of them can be fixed for all TBS values, and the other signalled explicitly.

If a common Msg3 PUSCH resource allocation is not needed, and the number of repetitions for Msg3 PUSCH for all the TBS, we can bundle either Msg3 PUSCH resource allocation, or the number of repetitions for Msg3 PUSCH in the table with TBSs as one single entry. Or we can bundle both Msg3 PUSCH resource allocation and number of repetitions for Msg3 PUSCH in the table with TBSs as one single entry.

Some embodiments provide the wireless device 120 with fewer choices than what the cell supports, e.g., based on one or more of:

Channel conditions.

Number of Msg3-grants that can be handled by base station 110 (i.e. table entries could be repeated with different number of Msg3-grants.)

Commonly used EDT size used in the operators network, i.e. allow for 'repeated' table entries with focus on higher or lower TBSs.

Other factors

If it is not assumed that the multi-grants all have the same frequency and time position, the tables in FIG. 19, 20, or 21 could (e.g., in an alternative embodiment) be extended to cover the relative time or frequency position of the grants, or a separate entry in the table of FIG. 22 could indicate not to have any dependency between e.g. the TBS and the time offset.

The TBS or grant information given in Tables 19, 20, or 21 may be set to any values, i.e. updated over time or set differently in different cells or by different operators.

Another solution is to only signal the largest (TBS, Number of Repetitions for Msg3 PUSCH) and the number of UL resources (grants) to the wireless device 120. The wireless device 120 can then derive the smaller number of (TBS, Number of Repetitions for Msg3 PUSCH) implicitly. The relationship between the largest (TBS, Number of Repetitions for Msg3 PUSCH) and the smaller one(s) can be predefined in the spec, or using a function. For example, the if the largest (TBS, Number of Repetitions for Msg3 PUSCH) can be used is (1000, 128) as shown by row index 6 in the table of FIG. 23, and the network indicates the wireless device 120 can have another two different choices with smaller TBSs. Then the wireless device 120 can derive the two smaller grants uses (504, 64), and (208, 32). The idea here is to use a table, e.g., similar to the table in FIG. 23, and the network indicate the largest (TBS, Number of Repetitions for Msg3 PUSCH) entry. Of course, this example should not be viewed as limiting, as other embodiments just as well indicate the smallest, for example. As this entry in the table is unique, the wireless device 120 can simply assume the other (TBS, Number of Repetitions for Msg3 PUSCH) are in the same row as the largest (TBS, Number of Repetitions for Msg3 PUSCH) entry. Notice the Number of Repetitions for Msg3 PUSCH can also be indirectly derived, e.g., by deriving it from the maximum number Y_max of repetitions supported in the cell.

In one embodiment the largest grant may be given with legacy signaling, and the offset for the smaller (TBS, Number of Repetitions for Msg3 PUSCH) may be specified in System Information.

Alternatively, a linear function may be used to derive the smaller (TBS, Number of Repetitions for Msg3 PUSCH) based on the largest (TBS_largest, Number of Repetitions for Msg3 PUSCH_largest). For example, if two smaller (TBS, Number of Repetitions for Msg3 PUSCH_largest) pairs are support in addition to the largest (TBS_largest, Number of Repetitions for Msg3 PUSCH_largest), the two smaller (TBS, Number of Repetitions for Msg3 PUSCH) pairs can be e.g.:

(round(TBS_largest/2), round(Number of Repetitions for Msg3 PUSCH_largest/2)),
(round(TBS_largest/3), round(Number of Repetitions for Msg3 PUSCH_largest/3)).

Another example is that, if two smaller (TBS, Number of Repetitions for Msg3 PUSCH) pairs are support in addition to the largest (TBS_largest, Number of Repetitions for Msg3 PUSCH_largest), the two smaller (TBS, Number of Repetitions for Msg3 PUSCH) pairs can be e.g., (round(TBS_largest/N), round(Number of Repetitions for Msg3 PUSCH_largest/N)) and, (round(TBS_largest/(N−1)), round (Number of Repetitions for Msg3 PUSCH_largest/(N−1))), where N is the number of signaled uplink resource allocation candidates. In this example, N=3.

The paragraphs above are just examples. Other embodiments may take into account the minimum viable packet as a parameter/factor when deriving the possible TB sizes. For example, the entry in the row of the above table always begin with the minimum viable packet, but with different granularities.

Or, we can simply use, e.g., a linear function to derive the larger (TBS, Number of Repetitions for Msg3 PUSCH) based on the minimum viable packet (TBS_minimum, Number of Repetitions for Msg3 PUSCH_minimum) by using similar methods stated above.

Particular embodiments above assume that the size of the RAR should remain the same to allow for multiplexing of legacy and EDT UEs in the same MAC RA response message. (A legacy wireless device 120 would have to be able to "read past" other RARs when looking for its own RAR given by RAPID). However, an alternative solution is to have separate RA response messages for legacy UEs and EDT UEs within the RAR window. That is an EDT wireless device 120 which has transmitted Msg1 on a EDT NPRACH resource will ignore the legacy RA response message and look for the new EDT RA response message. A new MAC header or different RAPIDs could be introduced for this purpose. In this case particular embodiments discussed above may be implemented without being restricted by size constraint, the new EDT RAR could have any size. In one embodiment the separate RAR message is in the padding region of the MAC PDU.

Figure 24:
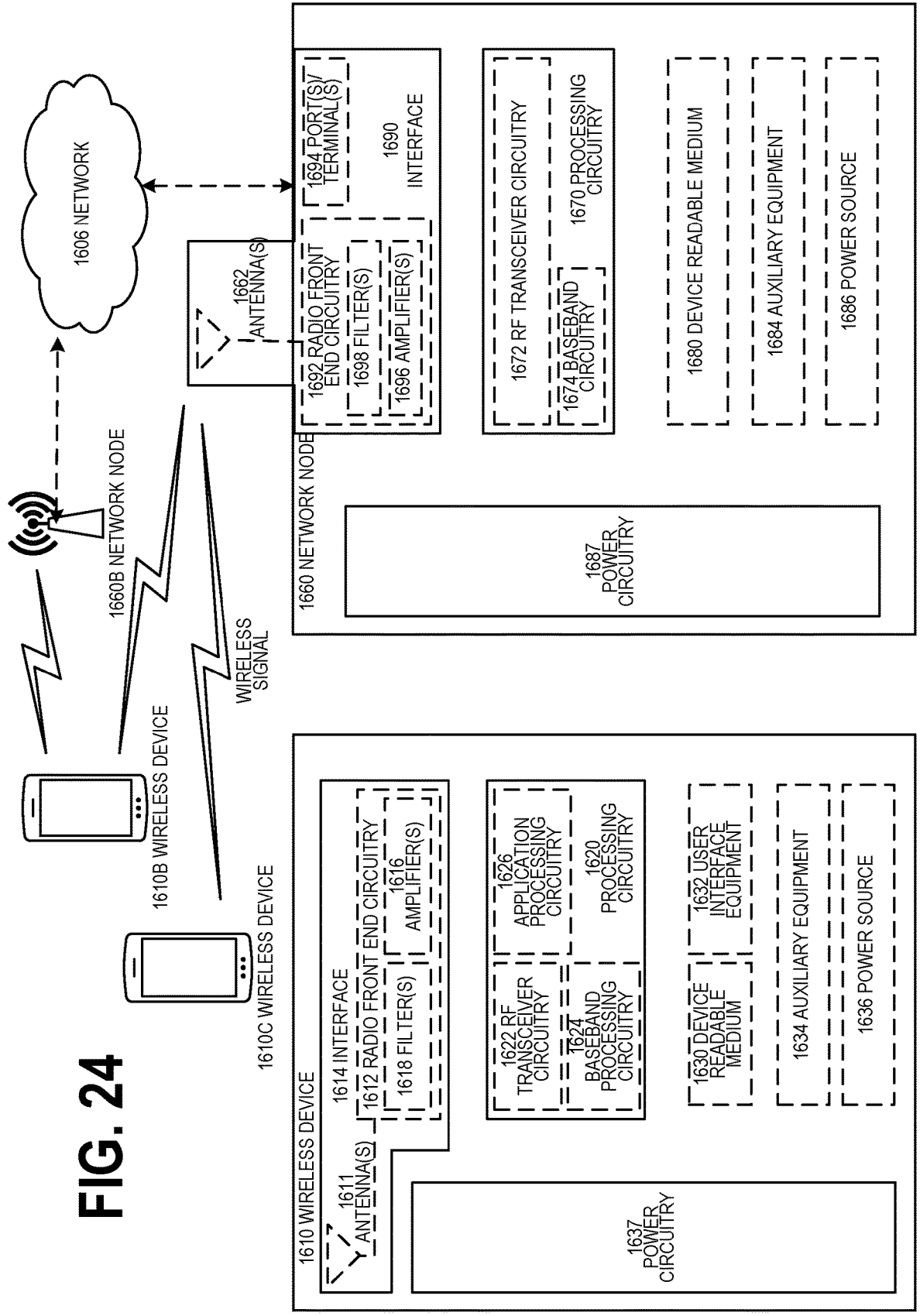
FIG. 24 is a schematic block diagram illustrating an example wireless network, according to one or more embodiments of the present disclosure.

Although the subject matter described herein may be implemented in any appropriate type of system using any suitable components, the embodiments disclosed herein are described in relation to a wireless network, such as the example wireless network illustrated in FIG. 24. For simplicity, the wireless network of FIG. 24 only depicts network 1606, network nodes 1660 and 1660*b*, and WDs 1610, 1610*b*, and 1610*c*. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node 1660 refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., Evolved-Serving Mobile Location Centres (E-SMLCs)), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 24, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 24 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units.

In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1692 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 24 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrowband internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1612 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity outlet) via input circuitry or an interface such as an electrical power cable. Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

Figure 25:
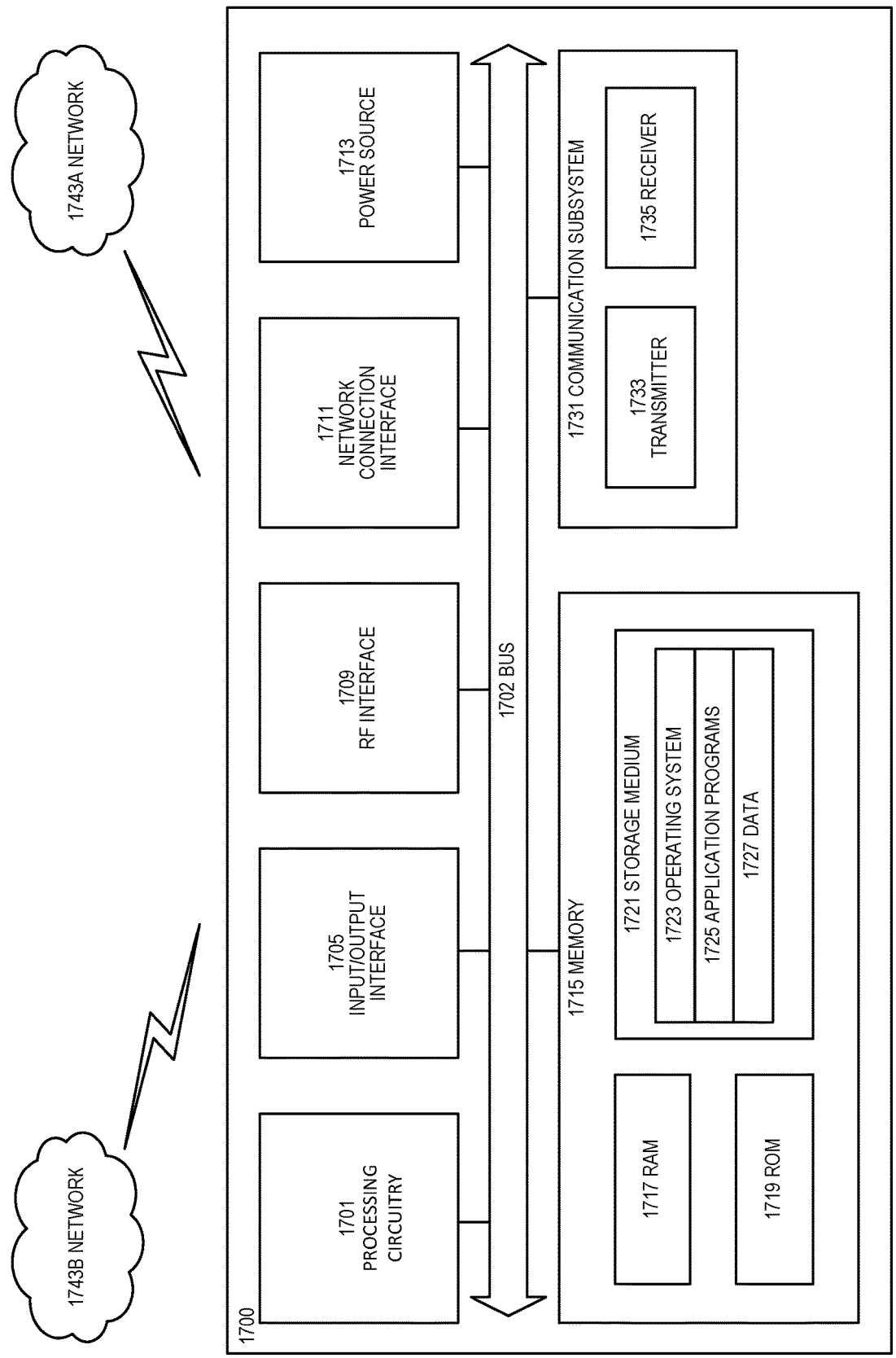
FIG. 25 is a schematic block diagram illustrating an example UE, according to one or more embodiments of the present disclosure.

FIG. 25 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1700 may be any UE identified by the 3rd Generation Partnership Project (3GPP), including a NB-IoT UE, a machine type communication (MTC) UE, and/or an enhanced MTC (eMTC) UE. UE 1700, as illustrated in FIG. 25, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeably. Accordingly, although FIG. 25 is a UE, the components discussed herein are equally applicable to a WD, and vice-versa.

In FIG. 25, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1713, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 25, or only a subset of the components. The level of integration between the components may vary from one UE to another UE. Further, certain UEs may contain multiple instances of a component, such as multiple processors, memories, transceivers, transmitters, receivers, etc.

In FIG. 25, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 25, RF interface 1709 may be configured to provide a communication interface to RF components such as a transmitter, a receiver, and an antenna. Network connection interface 1711 may be configured to provide a communication interface to network 1743a. Network 1743a may encompass wired and/or wireless networks such as a local-area network (LAN), a wide-area network (WAN), a computer network, a wireless network, a telecommunications network, another like network or any combination thereof. For example, network 1743a may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity module (SIM/RUIM), other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 25, processing circuitry 1701 may be configured to communicate with network 1743b using communication subsystem 1731. Network 1743a and network 1743b may be the same network or networks or different network or networks. Communication subsystem 1731 may be configured to include one or more transceivers used to communicate with network 1743b. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.11, Code Division Multiplexing Access (CDMA), Wide CDMA (WCDMA), GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743b may encompass wired and/or wireless networks such as a local-area network (LAN), a wide-area network (WAN), a computer network, a wireless network, a telecommunications network, another like network or any combination thereof. For example, network 1743b may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 26:
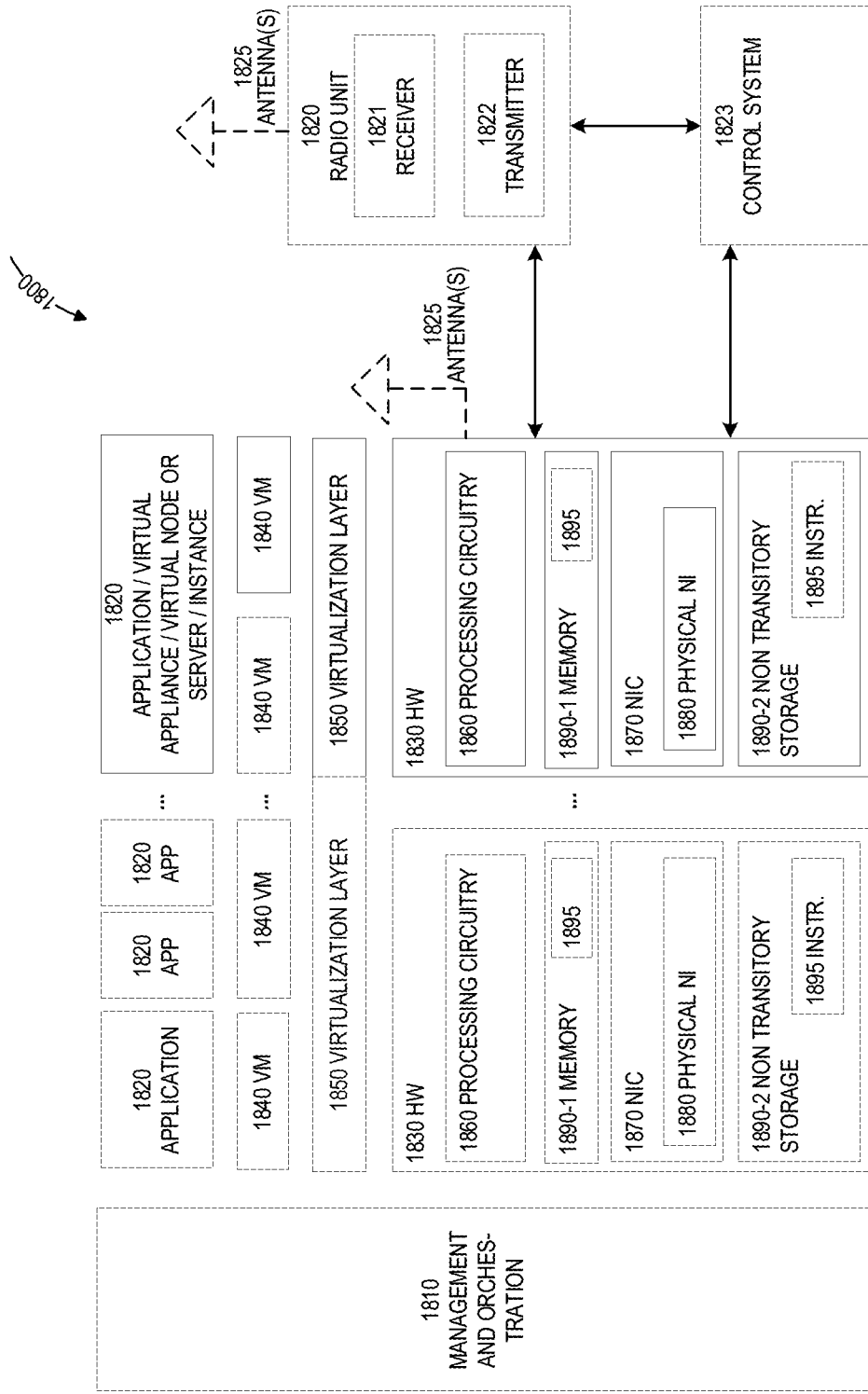
FIG. 26 is a schematic block diagram illustrating an example of a virtualization environment, according to one or more embodiments of the present disclosure.

FIG. 26 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 26, hardware 1830 may be a standalone network node with generic or specific components. Hardware 1830 may comprise antenna 1825 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 1810, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 26.

In some embodiments, one or more radio units 1820 that each include one or more transmitters 1822 and one or more receivers 1821 may be coupled to one or more antennas 1825. Radio units 1820 may communicate directly with hardware nodes 1830 via one or more appropriate network interfaces and may be used in combination with the virtual components to provide a virtual node with radio capabilities, such as a radio access node or a base station.

In some embodiments, some signalling can be effected with the use of control system 1823 which may alternatively be used for communication between the hardware nodes 1830 and radio units 1820.

Figure 27:
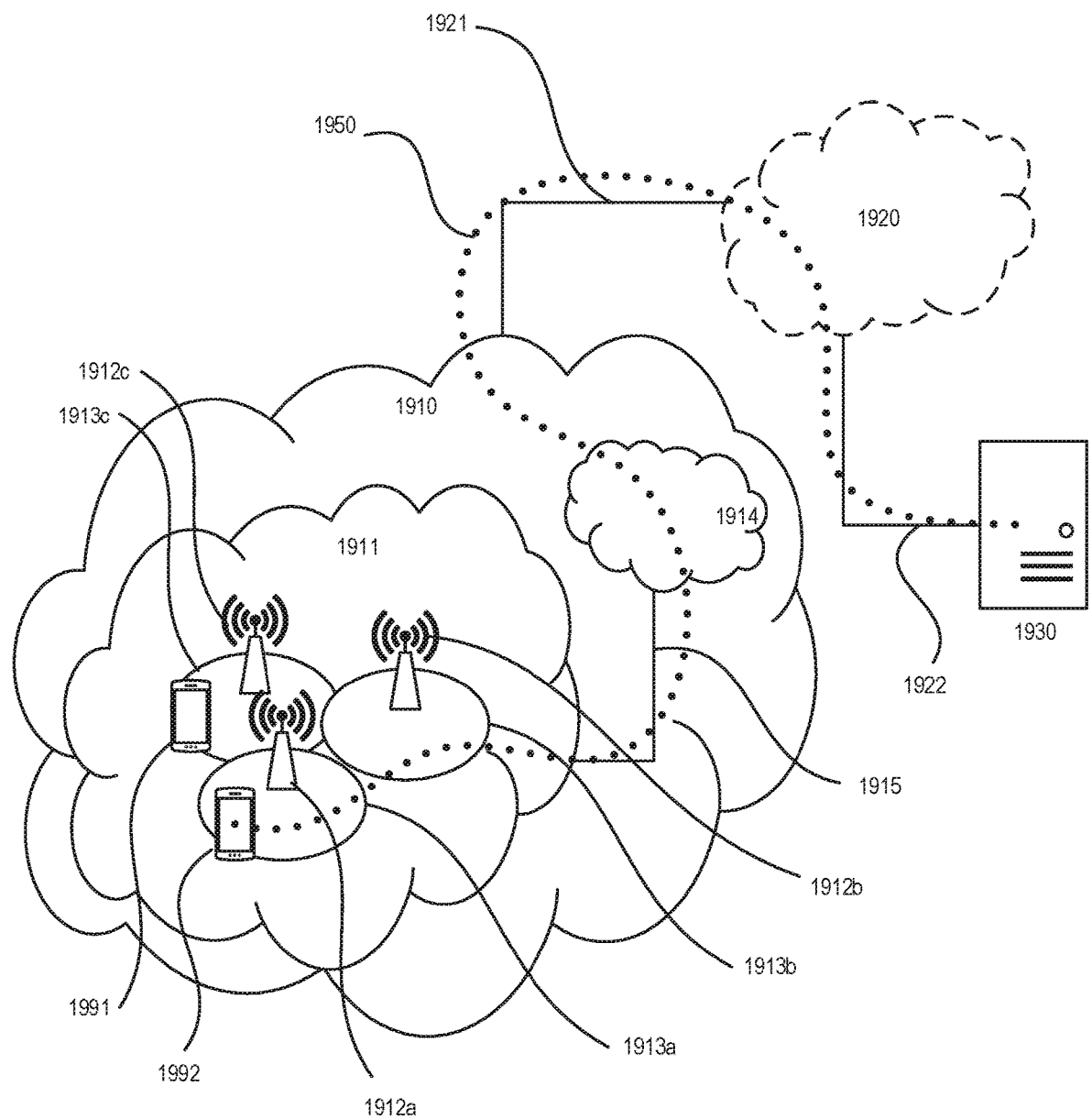
FIG. 27 is a schematic illustrating an example telecommunication network, according to one or more embodiments of the present disclosure.

FIG. 27 illustrates a telecommunication network connected via an intermediate network to a host computer in accordance with some embodiments. In particular, with reference to FIG. 27, in accordance with an embodiment, a communication system includes telecommunication network 1910, such as a 3GPP-type cellular network, which comprises access network 1911, such as a radio access network, and core network 1914. Access network 1911 comprises a plurality of base stations 1912*a*, 1912*b*, 1912*c*, such as NBs, eNBs, gNBs or other types of wireless access points, each defining a corresponding coverage area 1913*a*, 1913*b*, 1913*c*. Each base station 1912*a*, 1912*b*, 1912*c* is connectable to core network 1914 over a wired or wireless connection 1915. A first UE 1991 located in coverage area 1913*c* is configured to wirelessly connect to, or be paged by, the corresponding base station 1912*c*. A second UE 1992 in coverage area 1913*a* is wirelessly connectable to the corresponding base station 1912*a*. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 27 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 28:
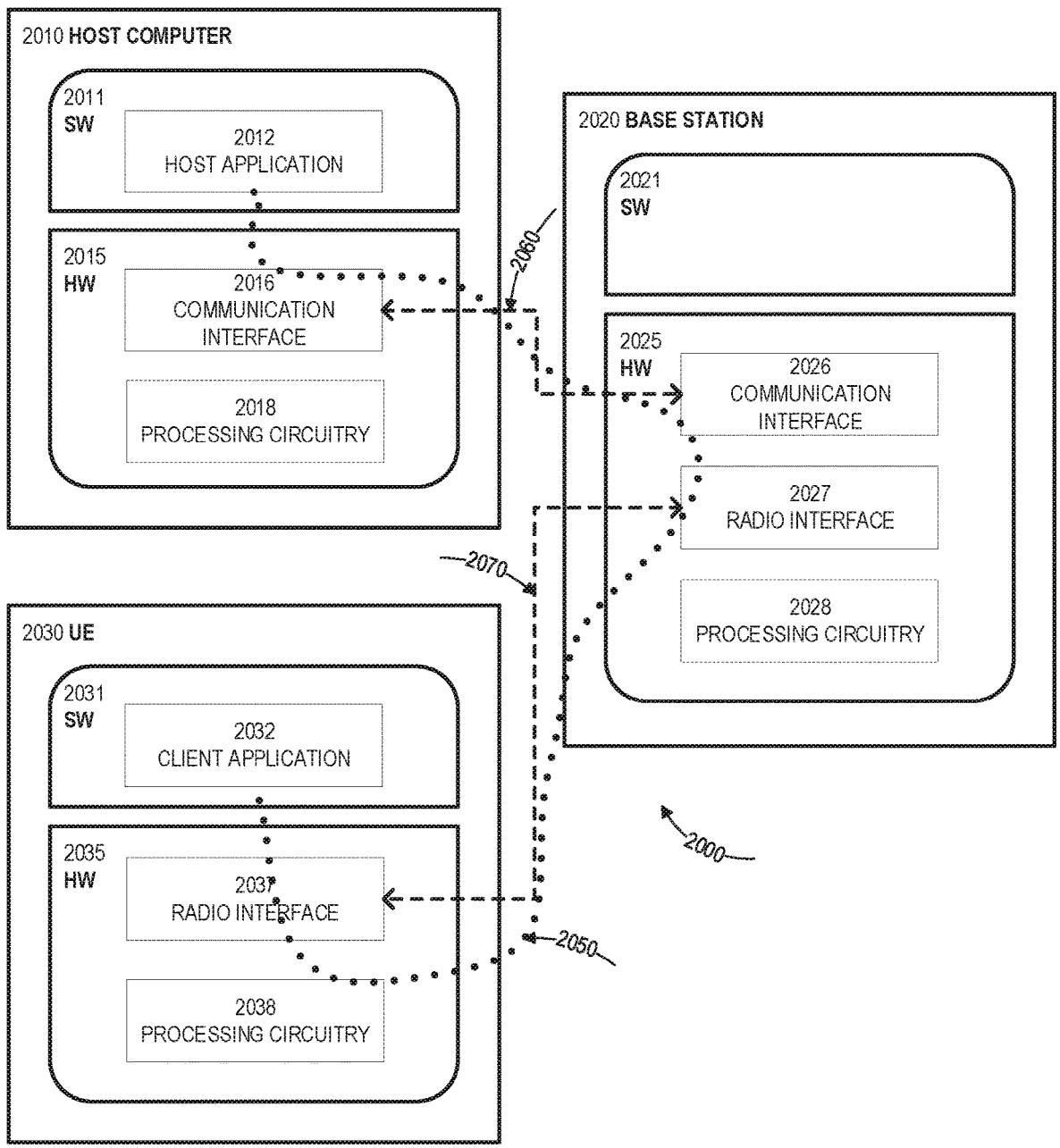
FIG. 28 is a schematic block diagram illustrating an example communication system, according to one or more embodiments of the present disclosure.

Example implementations, in accordance with an embodiment, of the UE, base station and host computer discussed in the preceding paragraphs will now be described with reference to FIG. 28. FIG. 28 illustrates host computer communicating via a base station with a user equipment over a partially wireless connection in accordance with some embodiments In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 28) served by base station 2020. Communication interface 2026 may be configured to facilitate connection 2060 to host computer 2010. Connection 2060 may be direct or it may pass through a core network (not shown in FIG. 28) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 28 may be similar or identical to host computer 1930, one of base stations 1912*a*, 1912*b*, 1912*c* and one of UEs 1991, 1992 of FIG. 27, respectively. This is to say, the inner workings of these entities may be as shown in FIG. 28 and independently, the surrounding network topology may be that of FIG. 27.

In FIG. 28, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the teachings of these embodiments may improve latency and/or power consumption and thereby provide benefits such as reduced user wait time, quicker handover between cells, faster random access, and/or extended battery life.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 29:
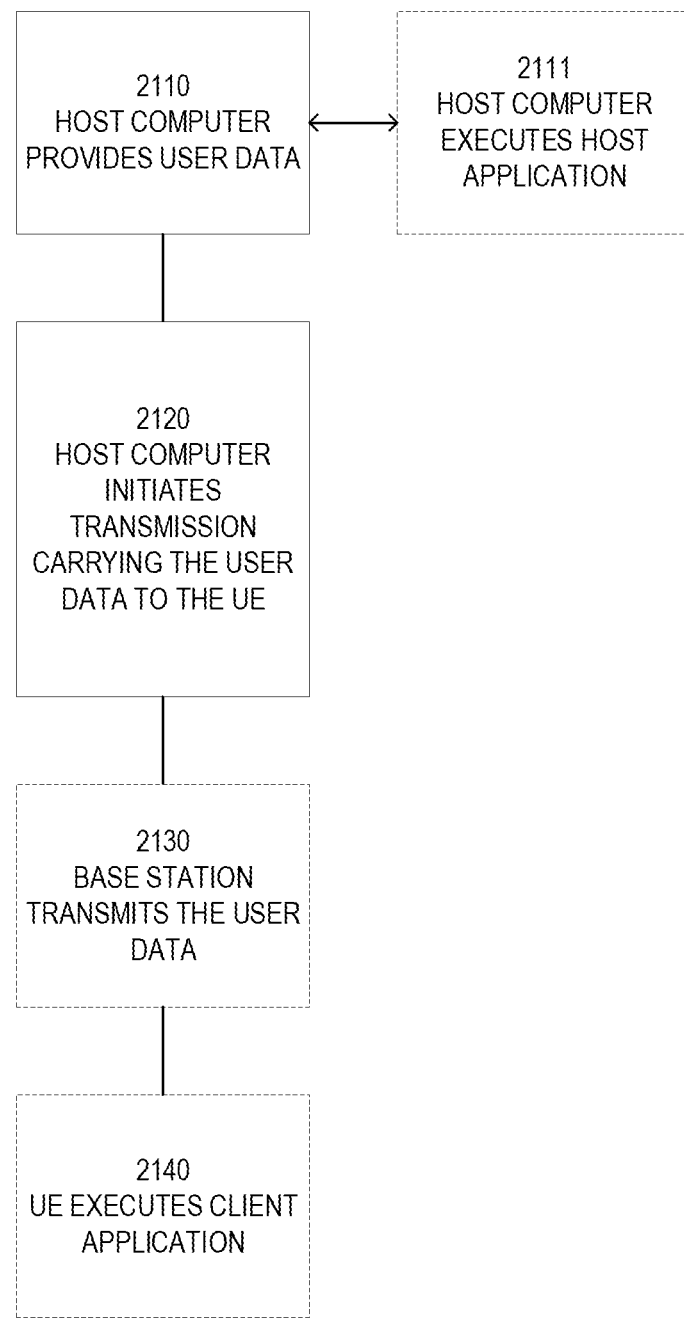
FIGS. 29-32 are flow diagrams, each of which illustrates an example method, according to particular embodiments of the present disclosure.

FIG. 29 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 29 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 30:
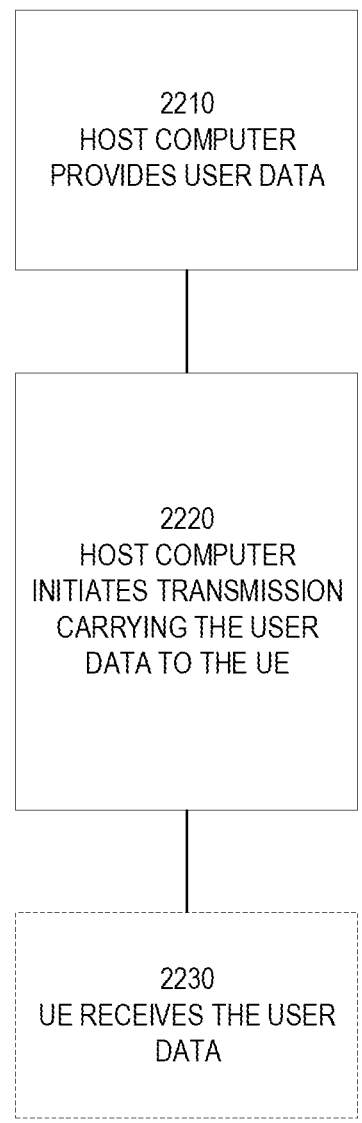

FIG. 30 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 30 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 31:
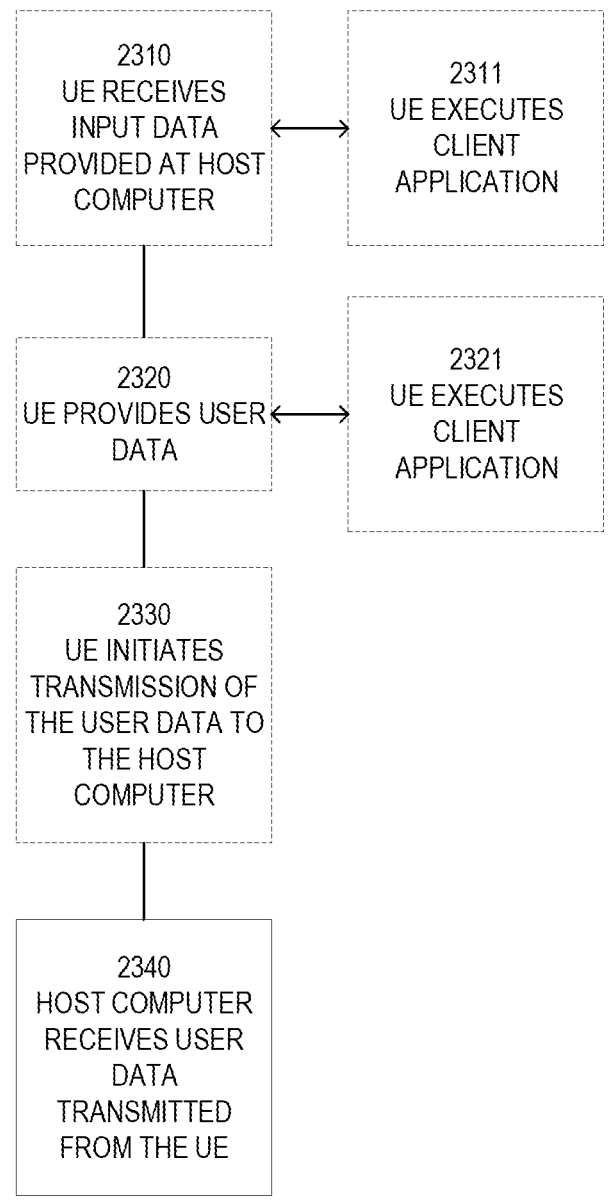

FIG. 31 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 31 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in step 2330 (which may be optional), transmission of the user data to the host computer. In step 2340 of the method, the host computer receives the user data transmitted from the UE, in accordance with the teachings of the embodiments described throughout this disclosure.

Figure 32:
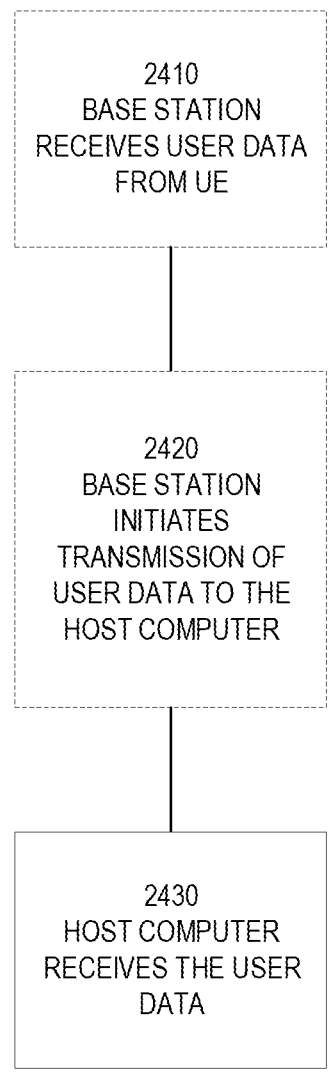

FIG. 32 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 32 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

In view of all of the above, embodiments of the present disclosure include any of the methods described above with respect to the wireless device 120, further comprising providing user data, and forwarding the user data to a host computer via the transmission to the base station 110.

Embodiments of the present disclosure also include any of the methods described above with respect to the base station

110, further comprising obtaining user data, and forwarding the user data to a host computer 2010 or a wireless device 120.

Embodiments of the present disclosure also include a wireless device 120 configured to perform any of the steps of any of the methods discussed herein with respect to the wireless device 120.

Embodiments of the present disclosure include a wireless device 120 comprising processing circuitry configured to perform any of the steps of any of the methods discussed herein with respect to the wireless device 120, and power supply circuitry configured to supply power to the wireless device 120.

Embodiments of the present disclosure include a wireless device 120 comprising processing circuitry and memory. The memory contains instructions executable by the processing circuitry whereby the wireless device 120 is configured to perform any of the steps of any of the methods discussed herein with respect to the wireless device 120.

Embodiments of the present disclosure include a user equipment (UE) comprising an antenna configured to send and receive wireless signals. The UE further comprises radio front-end circuitry connected to the antenna and to processing circuitry, and configured to condition signals communicated between the antenna and the processing circuitry. The processing circuitry is configured to perform any of the steps of any of the methods discussed herein with respect to the wireless device 120. The UE further comprises an input interface connected to the processing circuitry and configured to allow input of information into the UE to be processed by the processing circuitry. The UE further comprises an output interface connected to the processing circuitry and configured to output information from the UE that has been processed by the processing circuitry. The UE further comprises a battery connected to the processing circuitry and configured to supply power to the UE.

Embodiments of the present disclosure include a computer program comprising instructions which, when executed by at least one processor of a wireless device 120, causes the wireless device 120 to carry out the steps of any of the methods discussed herein with respect to the wireless device 120. Embodiments of the present disclosure include a carrier containing such a computer program, wherein the carrier is one of an electronic signal, optical signal, radio signal, or computer readable storage medium.

Embodiments of the present disclosure include a base station 110 configured to perform any of the steps of any of the methods described herein with respect to the base station 110.

Embodiments of the present disclosure include a base station 110 comprising processing circuitry configured to perform any of the steps of any of the methods described herein with respect to the base station 110, and power supply circuitry configured to supply power to the base station 110.

Embodiments of the present disclosure include a base station 110 comprising processing circuitry and memory. The memory contains instructions executable by the processing circuitry whereby the base station 110 is configured to perform any of the steps of any of the methods described herein with respect to the base station 110.

Embodiments of the present disclosure include a computer program comprising instructions which, when executed by at least one processor of a base station 110, causes the base station 110 to carry out the steps of any of the methods described herein with respect to the base station 110. Embodiments of the present disclosure include a carrier containing such a computer program, wherein the carrier is one of an electronic signal, optical signal, radio signal, or computer readable storage medium.

Embodiments of the present disclosure include a communication system including a host computer comprising processing circuitry configured to provide user data, and a communication interface configured to forward the user data to a cellular network for transmission to a user equipment (UE). The cellular network comprises a base station 110 having a radio interface and processing circuitry. The base station's processing circuitry is configured to perform any of the steps of any of the base station methods disclosed herein. In some embodiments, the communication system further includes the base station. In some embodiments, the communication system further includes the UE, wherein the UE is configured to communicate with the base station 110. In some embodiments, the processing circuitry of the host computer is configured to execute a host application, thereby providing the user data, and the UE comprises processing circuitry configured to execute a client application associated with the host application.

Embodiments of the present disclosure further include a method implemented in a communication system including a host computer, a base station and a user equipment (UE). The method comprises, at the host computer, providing user data, and initiating a transmission carrying the user data to the UE via a cellular network comprising the base station, wherein the base station performs any of the steps of any of the base station methods described herein. In some embodiments, the method further comprises, at the base station 110, transmitting the user data. In some embodiments, the user data is provided at the host computer by executing a host application, and the method further comprises, at the UE, executing a client application associated with the host application. Embodiments of the present disclosure further include the user equipment (UE) configured to communicate with the base station.

Embodiments of the present disclosure include a communication system including a host computer comprising processing circuitry configured to provide user data, and a communication interface configured to forward user data to a cellular network for transmission to a user equipment (UE). The UE comprises a radio interface and processing circuitry. The UE's components are configured to perform any of the steps of any of the wireless device 120 methods described herein. In some embodiments, the cellular network further includes a base station 110 configured to communicate with the UE. In some embodiments, the processing circuitry of the host computer is configured to execute a host application, thereby providing the user data, and the UE's processing circuitry is configured to execute a client application associated with the host application.

Embodiments of the present disclosure include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the methods described herein with respect to the wireless device 120. In some embodiments, the method further comprises at the UE, receiving the user data from the base station.

Embodiments of the present disclosure include a communication system including a host computer comprising a communication interface configured to receive user data originating from a transmission from a user equipment (UE) to a base station. The UE comprises a radio interface and processing circuitry. The UE's processing circuitry configured to perform any of the steps of any of the methods described herein with respect to the wireless device 120. In some embodiments, the communication system further includes the UE. In some embodiments, the communication system further includes the base station. The base station comprises a radio interface configured to communicate with the UE and a communication interface configured to forward to the host computer the user data carried by a transmission from the UE to the base station. In some embodiments, the processing circuitry of the host computer is configured to execute a host application, and the UE's processing circuitry is configured to execute a client application associated with the host application, thereby providing the user data. In some embodiments, the processing circuitry of the host computer is configured to execute a host application, thereby providing request data, and the UE's processing circuitry is configured to execute a client application associated with the host application, thereby providing the user data in response to the request data.

Embodiments of the present disclosure include a method implemented in a communication system including a host computer, a base station 110 and a user equipment (UE). The method comprises, at the host computer, receiving user data transmitted to the base station 110 from the UE. The UE performs any of the steps of any of the methods described herein with respect to the wireless device 120. In some embodiments, the method further comprises, at the UE, providing the user data to the base station. In some embodiments, the method further comprises, at the UE, executing a client application, thereby providing the user data to be transmitted, and, at the host computer, executing a host application associated with the client application. In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments of the present disclosure include a communication system including a host computer comprising a communication interface configured to receive user data originating from a transmission from a user equipment (UE) to a base station 110, wherein the base station 110 comprises a radio interface and processing circuitry, the base station's processing circuitry configured to perform any of the steps of any of the method described herein with respect to the base station 110. In some embodiments, the communication system further includes the base station 110. In some embodiments, the communication system further including the UE, wherein the UE is configured to communicate with the base station 110. In some embodiments, the processing circuitry of the host computer is configured to execute a host application, and the UE is configured to execute a client application associated with the host application, thereby providing the user data to be received by the host computer.

Embodiments of the present disclosure include a method implemented in a communication system including a host computer, a base station and a user equipment (UE). The method comprises, at the host computer, receiving, from the base station, user data originating from a transmission which the base station has received from the UE. The UE performs any of the steps of any of the methods described herein with respect to a wireless device 120. In some embodiments, the method further comprises, at the base station, receiving the user data from the UE. In some embodiments, the method further comprises, at the base station, initiating a transmission of the received user data to the host computer.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
    receiving a resource grant indicating a plurality of options for transmitting user data on an uplink during random access, each respective option comprising a transport block size (TBS) and a number of repetitions, wherein:

one of the TBSs is a maximum permitted TBS and the other TBSs are derived from the maximum permitted TBS using a predefined set of smaller TBS values; and the number of repetitions of each option is determined as a function of the maximum permitted TBS and a corresponding number of repetitions; and transmitting the user data on the uplink during random access to a base station according to at least one of the options.

2. The method of claim 1, further comprising receiving a time offset index indicating an amount of time between transmission start times respectively corresponding to the options.

3. The method of claim 1, further comprising receiving a frequency offset index indicating an amount of frequency between transmission frequencies respectively corresponding to the options.

4. The method of claim 1, further comprising using a predefined formula to calculate a first option of the plurality of options from a second option of the plurality of options.

5. The method of claim 1, wherein the plurality of options are a subset of a plurality of predefined options for the transmitting of the user data on the uplink during random access, and the method further comprises receiving an indication of how many options are in the subset via cell-specific signalling or via non-cell specific System Information broadcast.

6. The method of claim 1, wherein the maximum permitted TBS is one of a plurality of maximum permitted TBSs, each of which corresponds to a respective coverage enhancement level.

7. The method of claim 1, wherein each respective option further comprises a number of resource units and/or physical resource blocks corresponding to the TBS of the option.

8. A method performed by a base station, the method comprising:
transmitting a resource grant indicating a plurality of options from which a wireless device is permitted to select for use in transmitting user data on an uplink during random access, each respective option comprising a transport block size (TBS) and a number of repetitions, wherein:
one of the TBSs is a maximum permitted TBS and the other TBSs are derived from the maximum permitted TBS using a predefined set of smaller TBS values; and
the number of repetitions of each option is determined as a function of the maximum permitted TBS and a corresponding number of repetitions;
receiving the user data on the uplink during the random access according to at least one of the options.

9. The method of claim 8, further comprising determining a modulation and coding index for the resource grant based on channel conditions, a number of Msg3 grants supported by the base station, and/or a size predefined for transmitting during random access.

10. The method of claim 8, further comprising transmitting a time offset index indicating an amount of time between transmission start times respectively corresponding to the options.

11. The method of claim 8, further comprising transmitting a frequency offset index indicating an amount of frequency between transmission frequencies respectively corresponding to the options.

12. The method of claim 8, wherein the plurality of options are a subset of a plurality of predefined options for the transmitting of the user data on the uplink during random access, and the method further comprises transmitting an indication of how many options are in the subset via cell-specific signalling or via non-cell specific System Information broadcast.

13. The method of claim 8, wherein the maximum permitted TBS is one of a plurality of maximum permitted TBSs, each of which corresponds to a respective coverage enhancement level.

14. The method of claim 8, wherein each respective option further comprises a number of resource units and/or physical resource blocks corresponding to the TBS of the option.

15. A wireless device comprising:
communication circuitry configured to exchange information with a base station;
processing circuitry communicatively connected to the communication circuitry and configured to:
receive, via the communication circuitry, a resource grant indicating a plurality of options for transmitting user data on an uplink during random access, each respective option comprising a transport block size (TBS) and a number of repetitions, wherein:
one of the TBSs is a maximum permitted TBS and the other TBSs are derived from the maximum permitted TBS using a predefined set of smaller TBS values; and
the number of repetitions of each option is determined as a function of the maximum permitted TBS and a corresponding number of repetitions; and
transmit, via the communication circuitry, the user data on the uplink during random access to the base station according to at least one of the options.

16. The wireless device of claim 15, wherein the processing circuitry is further configured to receive, via the communication circuitry, a time offset index indicating an amount of time between transmission start times respectively corresponding to the options.

17. The wireless device of claim 15, wherein the processing circuitry is further configured to receive, via the communication circuitry, a frequency offset index indicating an amount of frequency between transmission frequencies respectively corresponding to the options.

18. The wireless device of claim 15, wherein the processing circuitry is further configured to use a predefined formula to calculate a first option of the plurality of options from a second option of the plurality of options.

19. The wireless device of claim 15, wherein the plurality of options are a subset of a plurality of predefined options for transmitting the user data on the uplink during random access, and the processing circuitry is further configured to receive, via the communication circuitry, an indication of how many options are in the subset via cell-specific signalling or via non-cell specific System Information broadcast.

20. The wireless device of claim 15, wherein each respective option further comprises a number of resource units and/or physical resource blocks corresponding to the TBS of the option.

21. A base station comprising:
communication circuitry configured to exchange information with a wireless device;
processing circuitry communicatively connected to the communication circuitry and configured to:
transmit, via the communication circuitry, a resource grant indicating a plurality of options from which the wireless device is permitted to select for use in transmitting user data on an uplink during random access, each respective option comprising a transport block size (TBS) and a number of repetitions, wherein:
one of the TBSs is a maximum permitted TBS and the other TBSs are derived from the maximum permitted TBS using a predefined set of smaller TBS values; and
the number of repetitions of each option is determined as a function of the maximum permitted TBS and a corresponding number of repetitions; and
receive, via the communication circuitry, the user data on the uplink during the random access according to at least one of the options.

22. The base station of claim 21, wherein the processing circuitry is further configured to determine a modulation and coding index for the resource grant based on channel conditions, a number of Msg3 grants supported by the base station, and/or a size predefined for transmitting during random access.

23. The base station of claim 21, wherein the processing circuitry is further configured to transmit, via the communication circuitry, a time offset index indicating an amount of time between transmission start times respectively corresponding to the options.

24. The base station of claim 21, wherein the processing circuitry is further configured to transmit, via the communication circuitry, a frequency offset index indicating an amount of frequency between transmission frequencies respectively corresponding to the options.

25. The base station of claim 21, wherein the plurality of options are a subset of a plurality of predefined options for the transmitting of the user data on the uplink during random access, and the processing circuitry is further configured to transmit an indication of how many options are in the subset via cell-specific signalling or via non-cell specific System Information broadcast.

26. The base station of claim 18, wherein each respective option further comprises a number of resource units and/or physical resource blocks corresponding to the TBS of the option.

* * * * *

UNITED STATES PATENT AND TRADEMARK OFFICE
CERTIFICATE OF CORRECTION

PATENT NO. : 11,812,476 B2
APPLICATION NO. : 17/833972
DATED : November 7, 2023
INVENTOR(S) : Höglund et al.

It is certified that error appears in the above-identified patent and that said Letters Patent is hereby corrected as shown below:

On the Title Page

On Page 2, item (56), under "OTHER PUBLICATIONS", in Column 1, Line 4, delete "protoco" and insert -- protocol --, therefor.

On Page 2, item (56), under "OTHER PUBLICATIONS", in Column 2, Line 18, delete "NG1" and insert -- WG1 --, therefor.

In the Specification

In Column 1, Line 7, delete "2020," and insert -- 2020, now U.S. Pat. No. 11,399,394, --, therefor.

In Column 7, Line 46, delete "Over" and insert -- over --, therefor.

In Column 9, Line 65, delete "one but" and insert -- one --, therefor.

In Column 16, Line 8, delete "t0" and insert -- $t_0$ --, therefor.

In Column 16, Line 9, delete "t0+Δt," and insert -- $t_0+\Delta t$, --, therefor.

In Column 16, Line 10, delete "t0+2*Δt." and insert -- $t_0+2*\Delta t$. --, therefor.

In Column 16, Line 46, delete "in selecting" and insert -- selecting --, therefor.

In Column 18, Line 9, delete "round(RUs_largest/N); and," and insert -- round(RUs_largest/N); and --, therefor.

In Column 18, Line 10, delete "round(RUs_largest/(N-1))" and insert -- round(RUs_largest/(N–1)), --, therefor.

Signed and Sealed this
Twenty-third Day of April, 2024

Katherine Kelly Vidal
*Director of the United States Patent and Trademark Office*

CERTIFICATE OF CORRECTION (continued)
U.S. Pat. No. 11,812,476 B2

In Column 18, Line 56, delete "level 0 & 1" and insert -- levels 0 & 1 --, therefor.

In Column 20, Line 58, delete "multigrants" and insert -- multi grants --, therefor.

In Column 22, Line 35, delete "FIG. 19, 20, or 21" and insert -- FIGS. 19, 20, or 21 --, therefor.

In Column 22, Lines 51-52, delete "the if" and insert -- if --, therefor.

In Column 23, Line 12, delete "support" and insert -- supported --, therefor.

In Column 23, Line 21, delete "support" and insert -- supported --, therefor.

In Column 25, Line 45, delete "NodeB's." and insert -- NodeBs. --, therefor.

In Column 28, Line 59, delete "(CPE). a" and insert -- (CPE), a --, therefor.

In Column 28, Line 60, delete "etc.." and insert -- etc. --, therefor.

In Column 39, Line 8, delete "it may" and insert -- may --, therefor.

In Column 39, Line 45, delete "etc.; the" and insert -- etc. The --, therefor.

In the Claims

In Column 48, Line 17, in Claim 26, delete "claim 18," and insert -- claim 21, --, therefor.